(12) United States Patent
Furuta

(10) Patent No.: US 12,210,782 B2
(45) Date of Patent: Jan. 28, 2025

(54) SERVER, PRINTING SYSTEM, INFORMATION PROCESSING METHOD, AND NON-TRANSITORY COMPUTER-READABLE STORAGE MEDIUM

(71) Applicant: SEIKO EPSON CORPORATION, Tokyo (JP)

(72) Inventor: Yasuhiro Furuta, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/366,500

(22) Filed: Aug. 7, 2023

(65) Prior Publication Data

US 2024/0045623 A1 Feb. 8, 2024

(51) Int. Cl.
*G06F 3/12* (2006.01)
(52) U.S. Cl.
CPC .......... *G06F 3/1203* (2013.01); *G06F 3/1268* (2013.01); *G06F 3/1288* (2013.01)
(58) Field of Classification Search
CPC ..... G06F 3/1203; G06F 3/1268; G06F 3/1288
See application file for complete search history.

(56) References Cited

U.S. PATENT DOCUMENTS

2019/0243584 A1* 8/2019 Yashiro ................. G06F 3/1288
2022/0066707 A1* 3/2022 Shiohara ............... G06F 3/1204

FOREIGN PATENT DOCUMENTS

JP 2022-038375 A 3/2022

* cited by examiner

*Primary Examiner* — Akwasi M Sarpong
*Assistant Examiner* — Michael L Burleson
(74) *Attorney, Agent, or Firm* — WORKMAN NYDEGGER

(57) ABSTRACT

In a case where a second image processing device is designated as an image processing device used in printing according to a printing job, a printing control unit transmits a printing request to a second printing service system only when the printing job is a printing job corresponding to a printing instruction of a second user, and in a case where a first image processing device is designated as an image processing device used in printing according to the printing job, the printing control unit transmits a printing request to the second printing service system regardless of the printing job is a printing job corresponding to a printing instruction of which user.

6 Claims, 19 Drawing Sheets

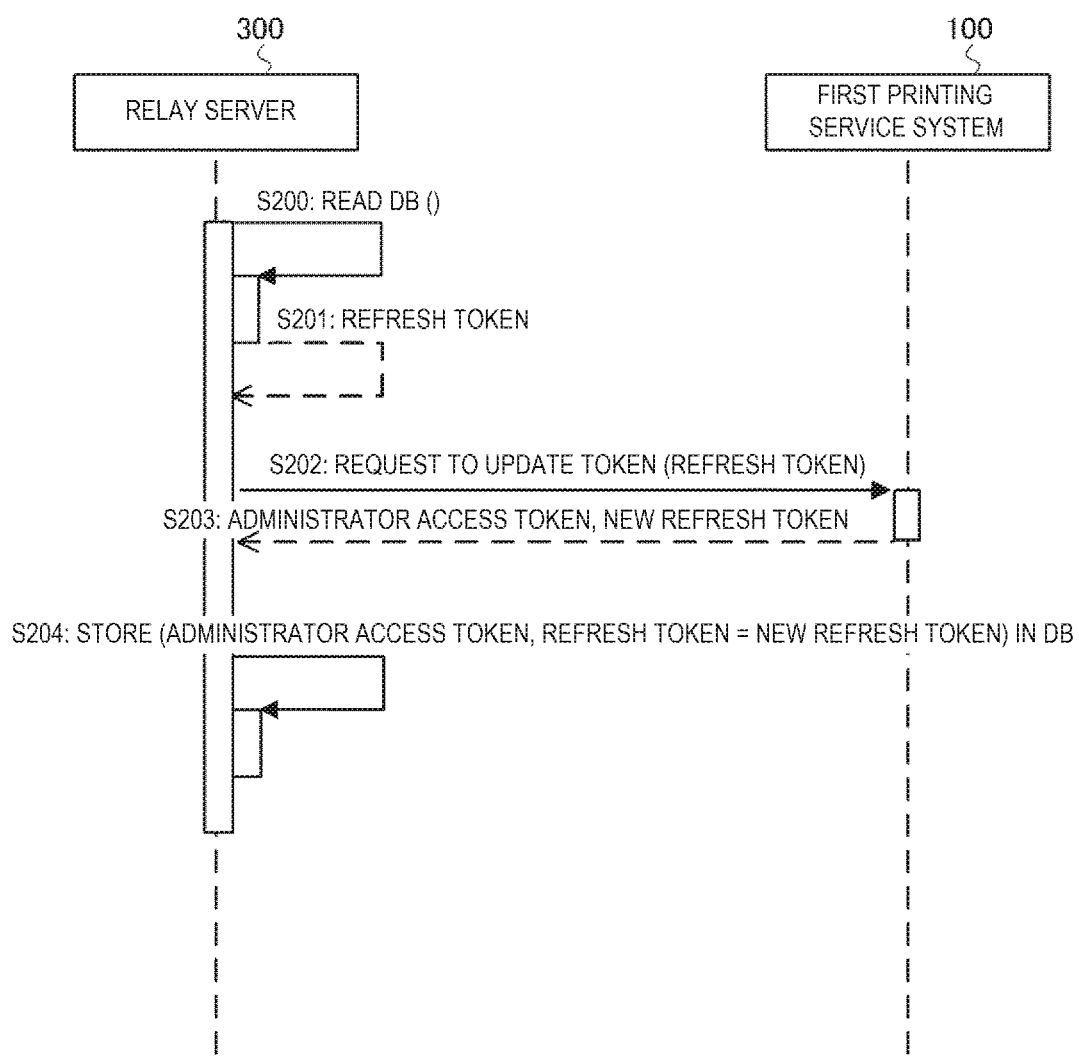

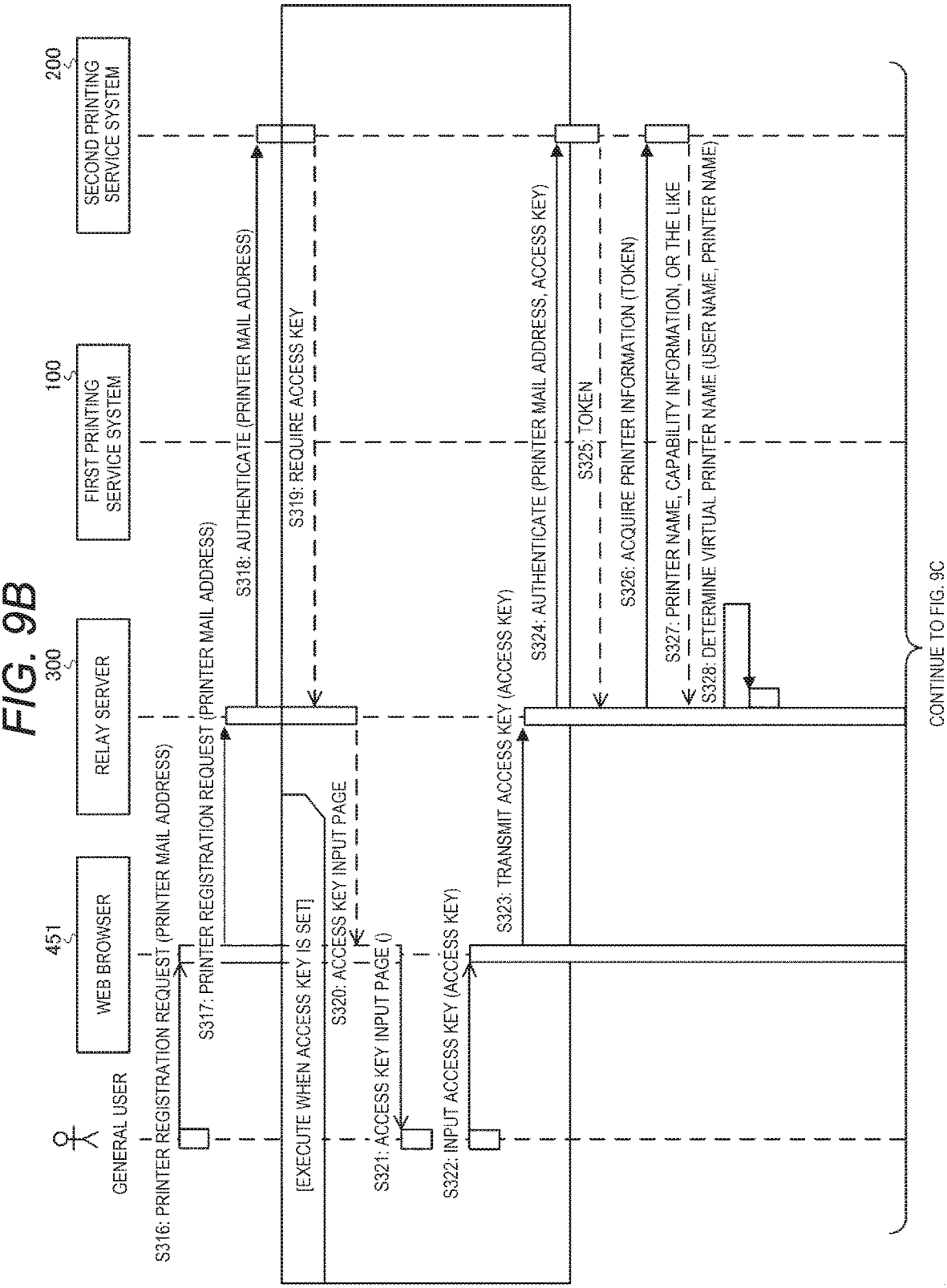

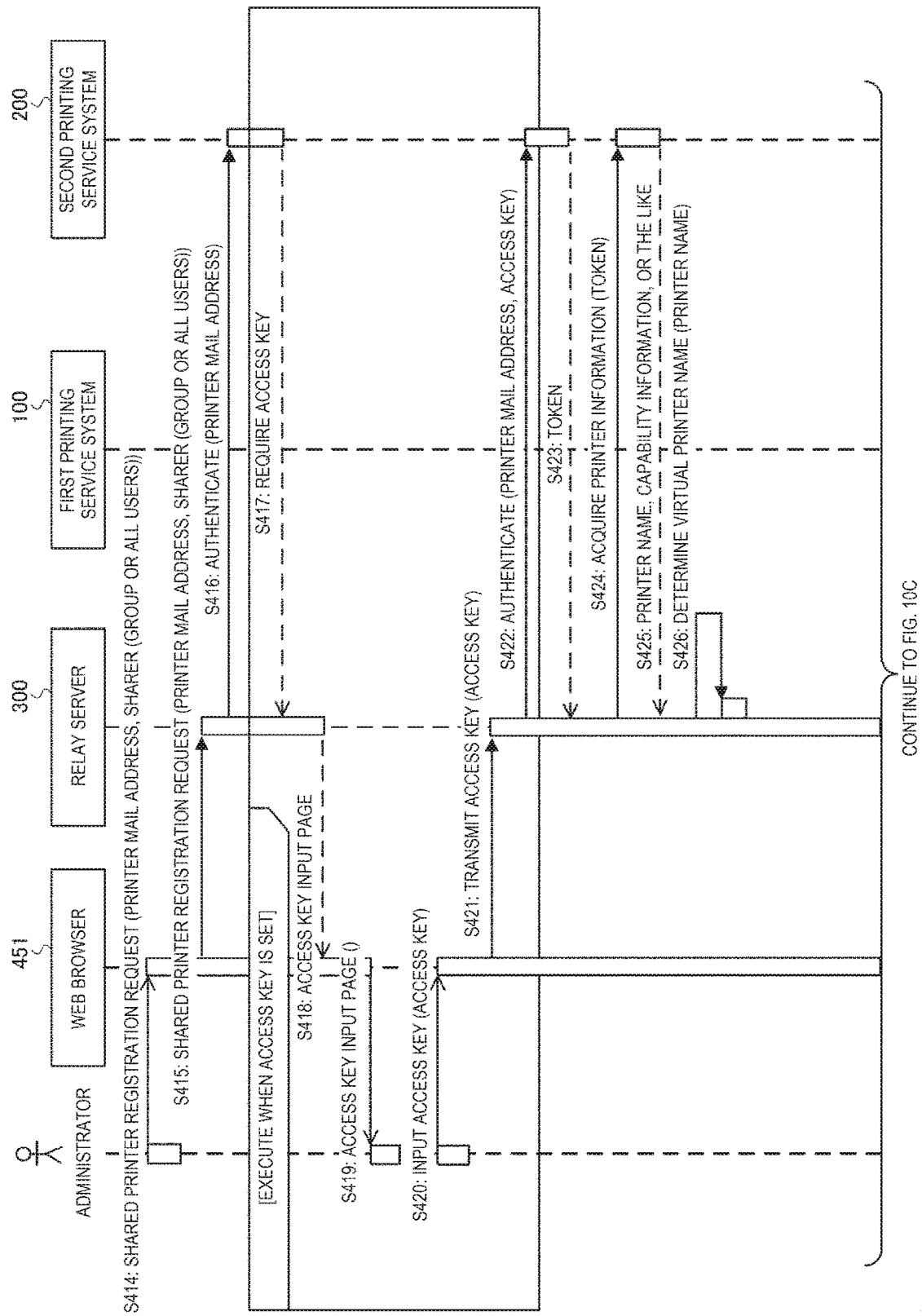

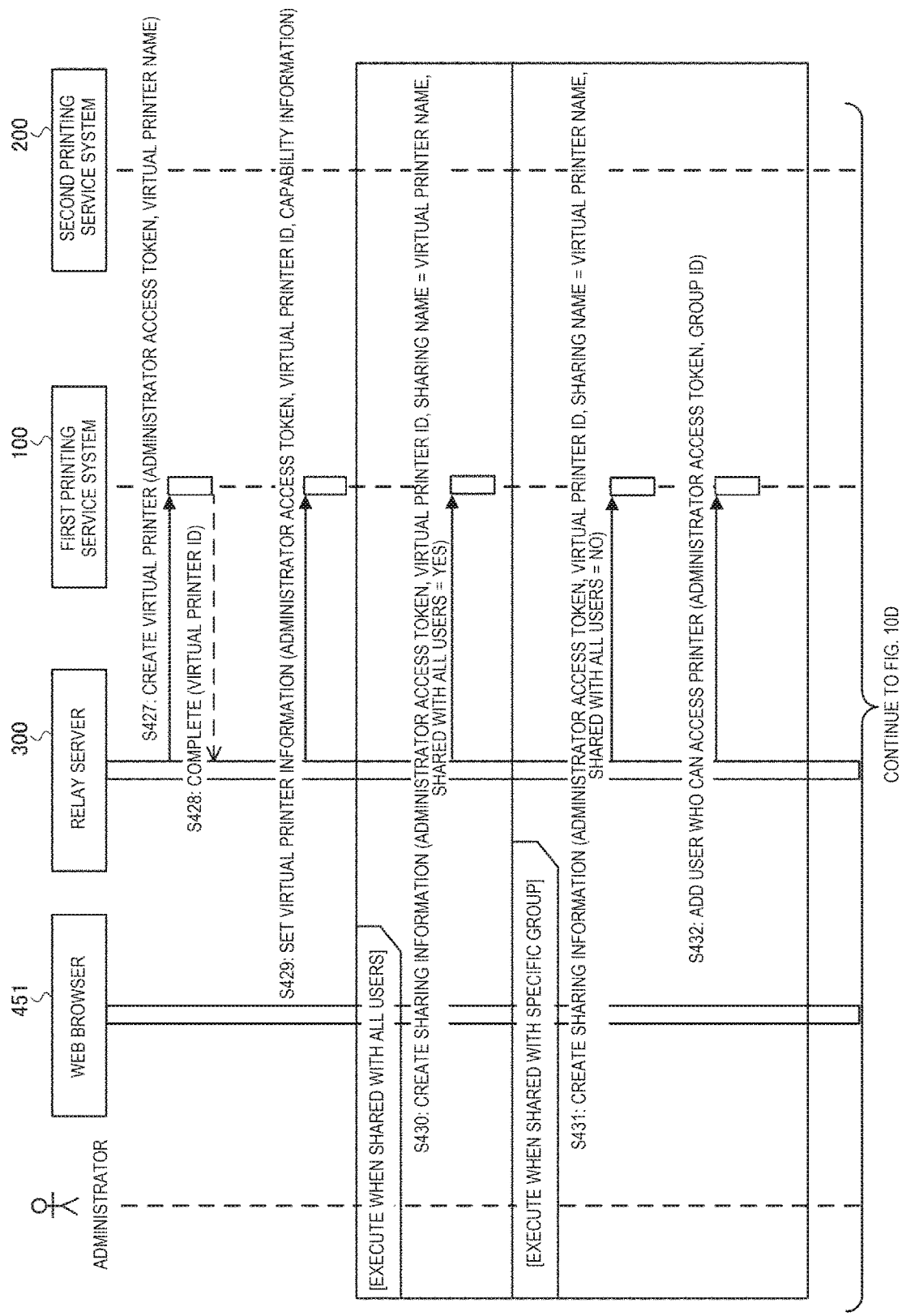

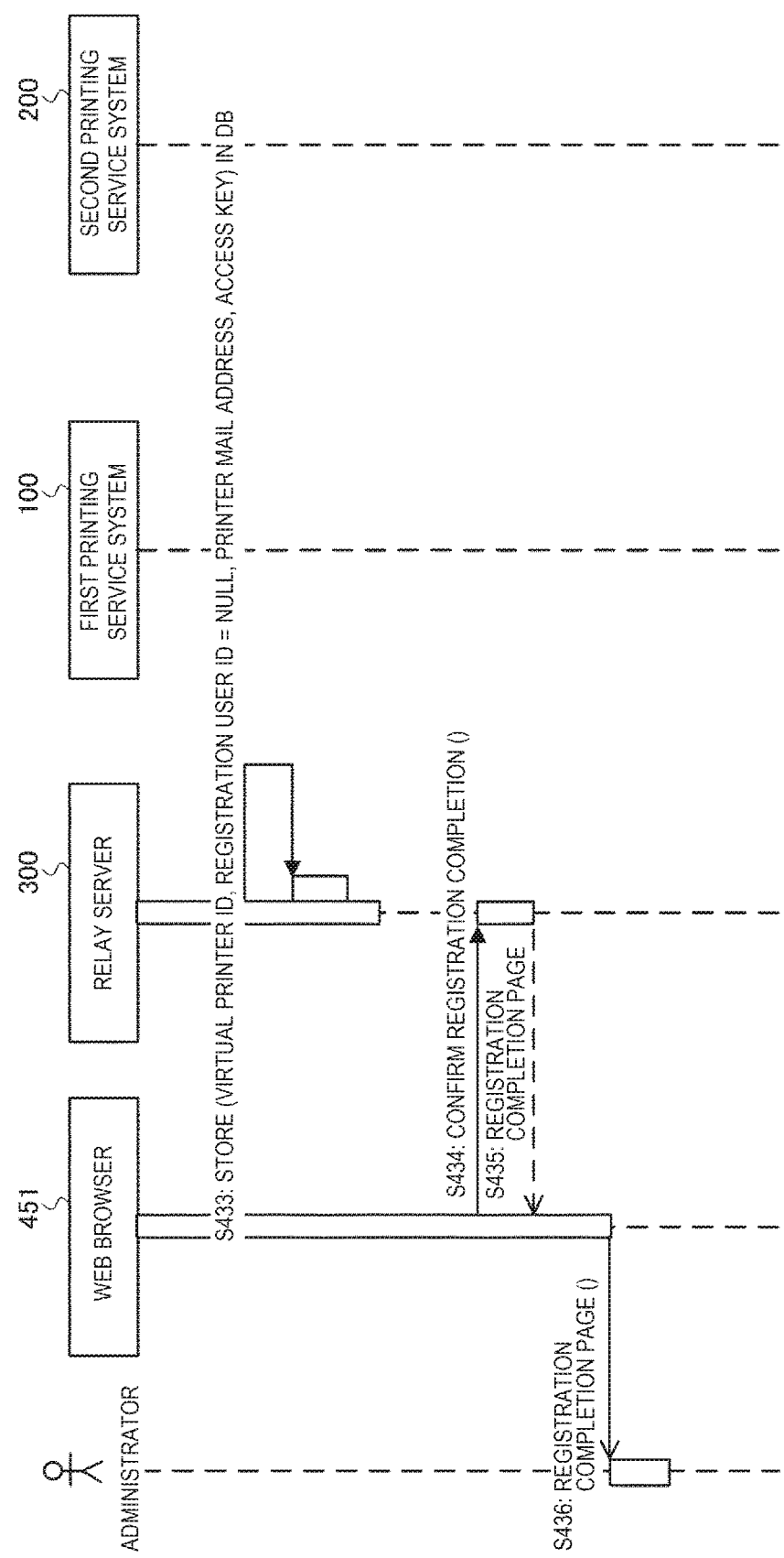

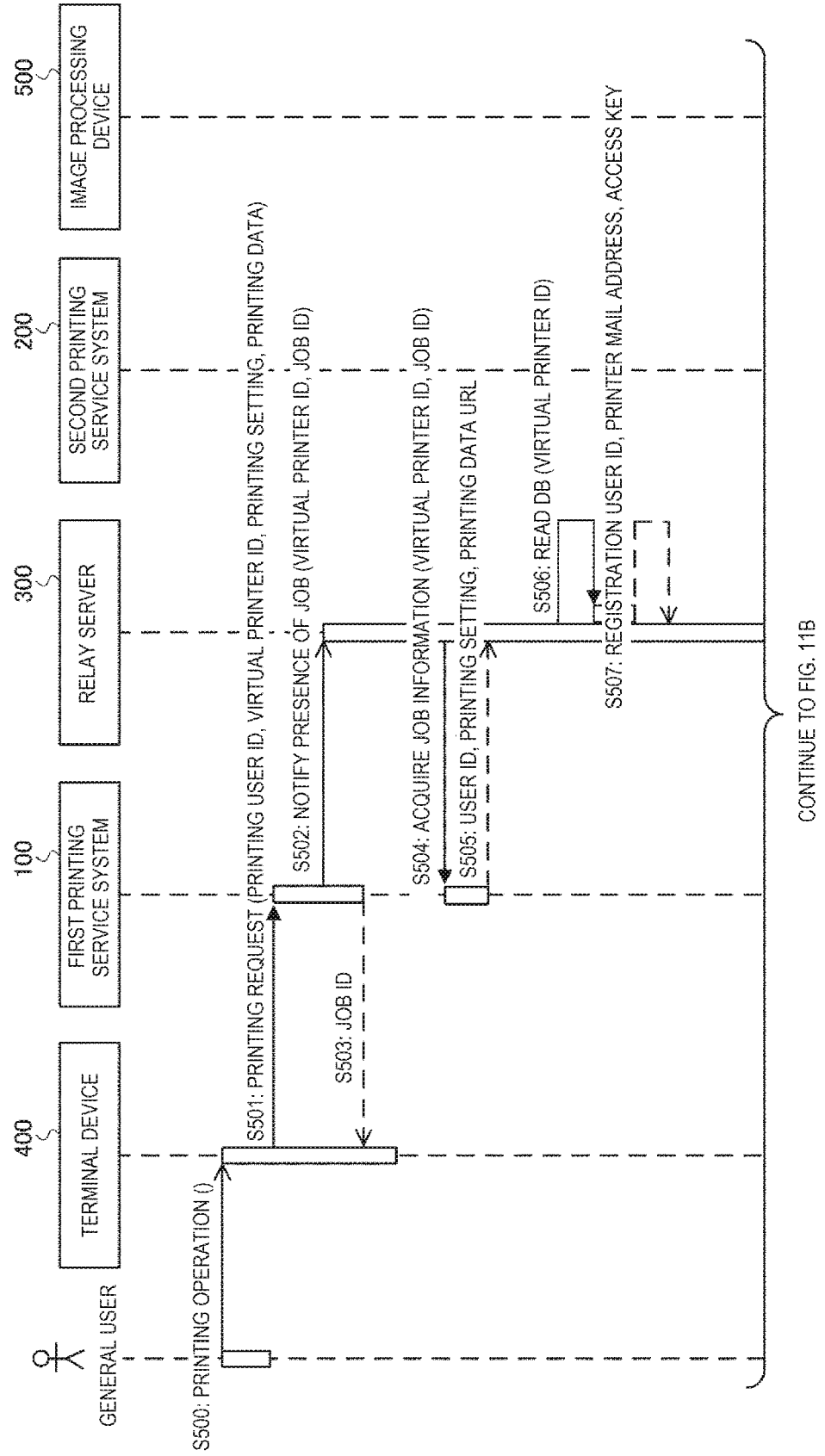

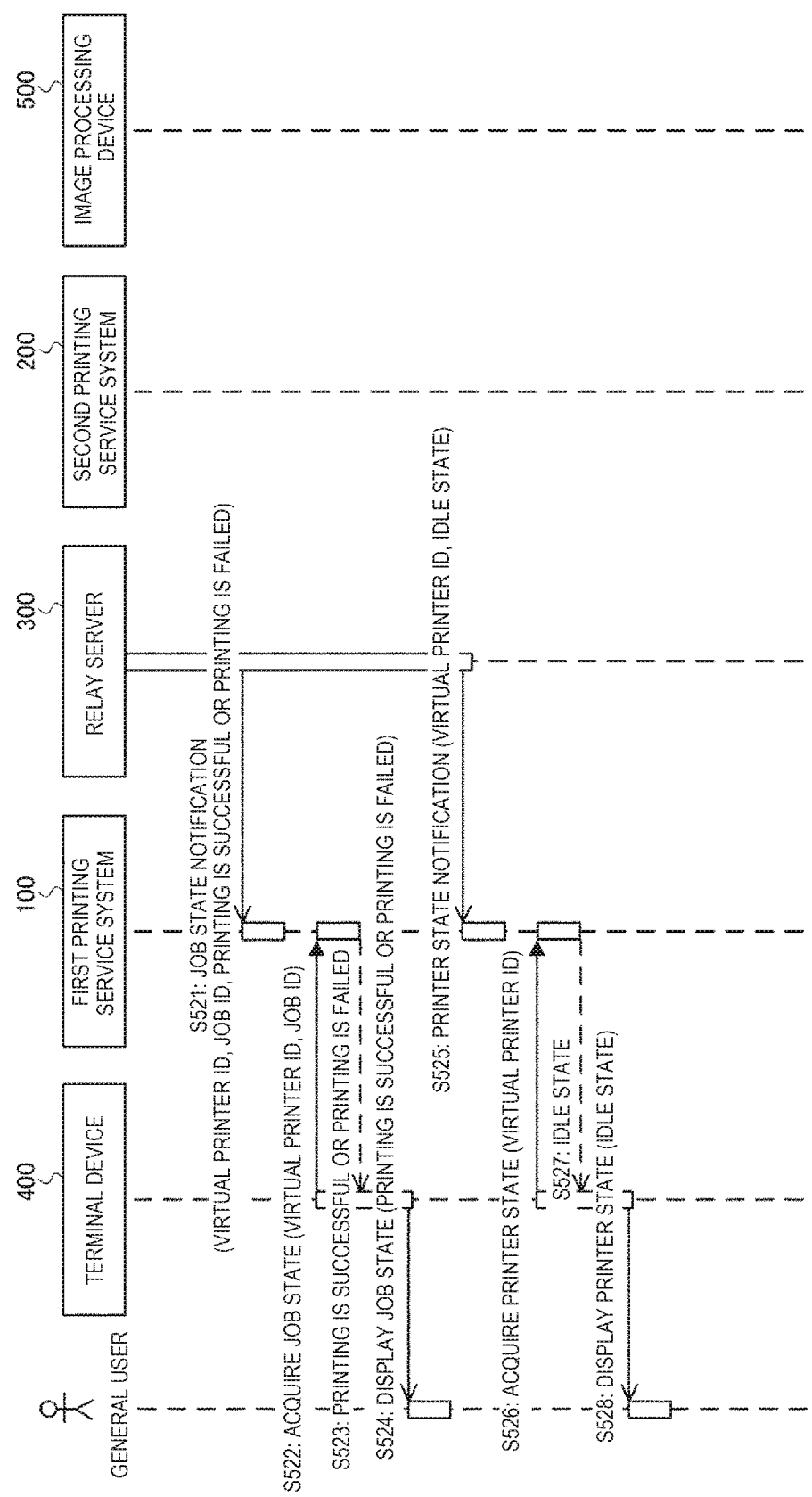

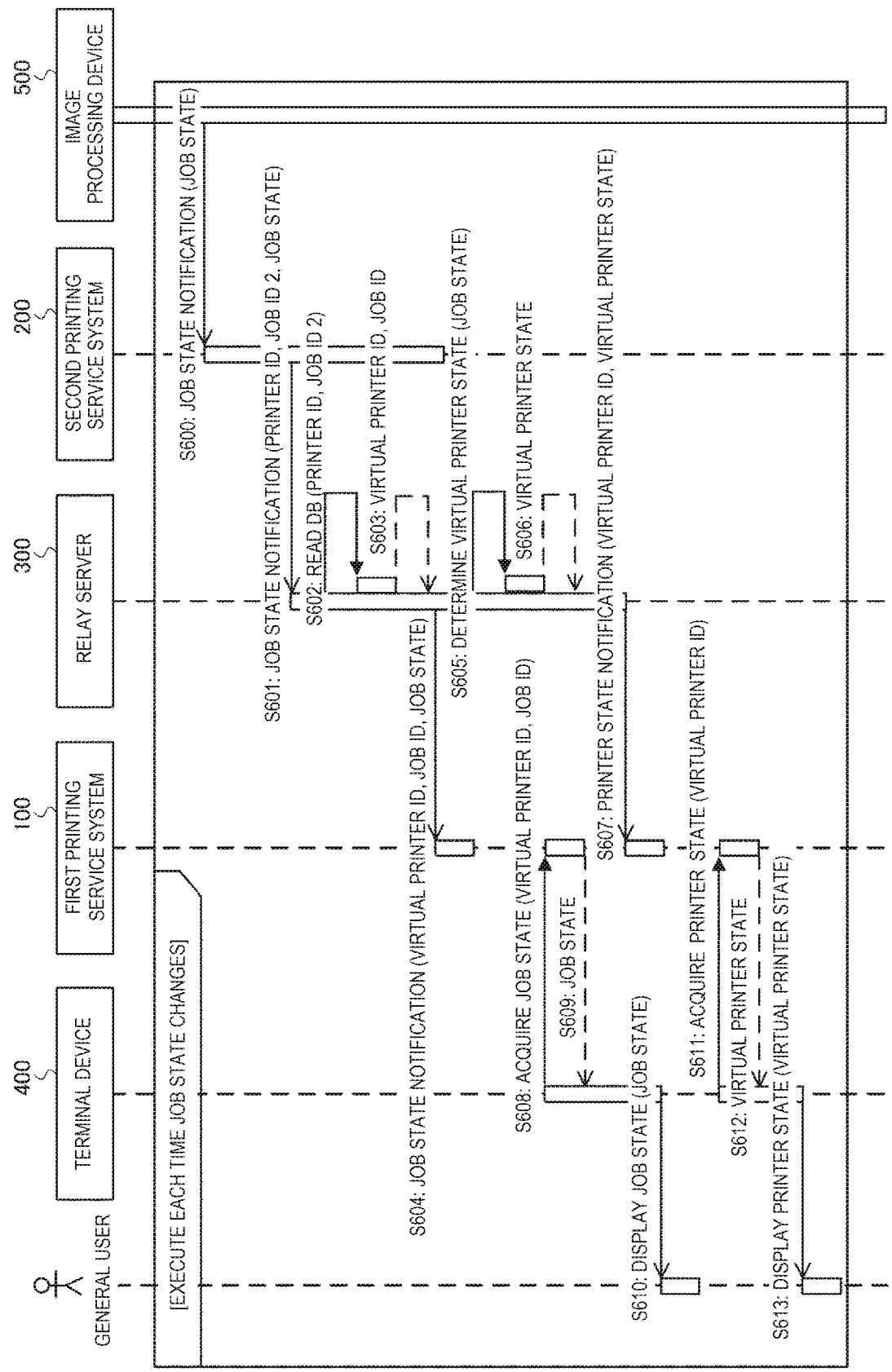

SERVER, PRINTING SYSTEM, INFORMATION PROCESSING METHOD, AND NON-TRANSITORY COMPUTER-READABLE STORAGE MEDIUM

The present application is based on, and claims priority from JP Application Serial Number 2022-126318, filed Aug. 8, 2022, the disclosure of which is hereby incorporated by reference herein in its entirety.

BACKGROUND

1. Technical Field

The present disclosure relates to a server, a printing system, an information processing method, and a non-transitory computer-readable storage medium.

2. Related Art

A printing system implemented by combining different systems on a network is known. For example, JP-A-2022-038375 discloses a printing system implemented by combining a first cloud printing service system and a second cloud printing service system. The printing system further includes a cloud printing management service system that serves as a bridge between the first cloud printing service system and the second cloud printing service system. The cloud printing management service system associates a virtual printer registered in the first cloud printing service system with a printing device registered in the second cloud printing service system, thereby enabling the printing device to perform printing via the first cloud printing service system and the second cloud printing service system.

However, in the technique disclosed in JP-A-2022-038375, when the printing device performs printing via the first cloud printing service system and the second cloud printing service system, the printing device intended to be used only by a specific user may be used by a user other than the specific user.

SUMMARY

A server according to the present disclosure is connected to a first printing service system and a second printing service system, the second printing service system being connected to a first image processing device and a second image processing device. The server includes: a registration reception unit configured to acquire a registration instruction of the first image processing device from a first user having a first right or a registration instruction of the second image processing device from a second user having a second right that is a right more restricted than the first right; a registration unit configured to register the first image processing device in the first printing service system when the registration instruction of the first image processing device is acquired, and register the second image processing device in the first printing service system when the registration instruction of the second image processing device is acquired; and a printing control unit configured to transmit a printing request to the second printing service system according to a printing job from the first printing service system. In a case where the second image processing device is designated as an image processing device used in printing according to the printing job, the printing control unit transmits the printing request for requesting printing by the second image processing device to the second printing service system only when the printing job is a printing job corresponding to a printing instruction of the second user, and in a case where the first image processing device is designated as an image processing device used in printing according to the printing job, the printing control unit transmits the printing request for requesting printing by the first image processing device to the second printing service system regardless of the printing job is a printing job corresponding to a printing instruction of which user.

A printing system according to the present disclosure includes a first printing service system, a first image processing device, a second image processing device, a second printing service system connected to the first image processing device and the second image processing device, and a server connected to the first printing service system and the second printing service system. The server includes: a registration reception unit configured to acquire a registration instruction of the first image processing device from a first user having a first right or a registration instruction of the second image processing device from a second user having a second right that is a right more restricted than the first right; a registration unit configured to register the first image processing device in the first printing service system when the registration instruction of the first image processing device is acquired, and register the second image processing device in the first printing service system when the registration instruction of the second image processing device is acquired; and a printing control unit configured to transmit a printing request to the second printing service system according to a printing job from the first printing service system. In a case where the second image processing device is designated as an image processing device used in printing according to the printing job, the printing control unit transmits the printing request for requesting printing by the second image processing device to the second printing service system only when the printing job is a printing job corresponding to a printing instruction of the second user, and in a case where the first image processing device is designated as an image processing device used in printing according to the printing job, the printing control unit transmits the printing request for requesting printing by the first image processing device to the second printing service system regardless of the printing job is a printing job corresponding to a printing instruction of which user. The first image processing device or the second image processing device executes printing processing based on the printing request.

An information processing method according to the present disclosure is an information processing method for a server connected to a first printing service system and a second printing service system, the second printing service system being connected to a first image processing device and a second image processing device. The information processing method includes: acquiring a registration instruction of the first image processing device from a first user having a first right or a registration instruction of the second image processing device from a second user having a second right that is a right more restricted than the first right; registering the first image processing device in the first printing service system when the registration instruction of the first image processing device is acquired, and registering the second image processing device in the first printing service system when the registration instruction of the second image processing device is acquired; and transmitting a printing request to the second printing service system according to a printing job from the first printing service system. In processing of transmitting the printing request, in a case where the second image processing device is designated as an image processing device used in printing according to the printing job, the printing request for requesting printing by the second image processing device is transmitted to the second printing service system only when the printing job is a printing job corresponding to a printing instruction of the second user, and in a case where the first image processing device is designated as an image processing device used in printing according to the printing job, the printing request for requesting printing by the first image processing device is transmitted to the second printing service system regardless of the printing job is a printing job corresponding to a printing instruction of which user.

In a non-transitory computer-readable storage medium storing a program according to the present disclosure, the program causes a computer to execute following steps, the computer being a computer of a server connected to a first printing service system and a second printing service system, the second printing service system being connected to a first image processing device and a second image processing device. The steps include: a registration reception step of acquiring a registration instruction of the first image processing device from a first user having a first right or a registration instruction of the second image processing device from a second user having a second right that is a right more restricted than the first right; a registration step of registering the first image processing device in the first printing service system when the registration instruction of the first image processing device is acquired, and registering the second image processing device in the first printing service system when the registration instruction of the second image processing device is acquired; and a printing control step of transmitting a printing request to the second printing service system according to a printing job from the first printing service system. In the printing control step, in a case where the second image processing device is designated as an image processing device used in printing according to the printing job, the printing request for requesting printing by the second image processing device is transmitted to the second printing service system only when the printing job is a printing job corresponding to a printing instruction of the second user, and in a case where the first image processing device is designated as an image processing device used in printing according to the printing job, the printing request for requesting printing by the first image processing device is transmitted to the second printing service system regardless of the printing job is a printing job corresponding to a printing instruction of which user.

BRIEF DESCRIPTION OF THE DRAWINGS

FIG. 8 is a sequence chart illustrating an example of a flow of credential information updating processing.

FIG. 9B is a sequence chart illustrating the example of the flow of the personal printer registration processing.

FIG. 10B is a sequence chart illustrating the example of the flow of the shared printer registration processing.

FIG. 10C is a sequence chart illustrating the example of the flow of the shared printer registration processing.

FIG. 10D is a sequence chart illustrating the example of the flow of the shared printer registration processing.

FIG. 11A is a sequence chart illustrating an example of a flow of printing processing.

FIG. 11C is a sequence chart illustrating the example of the flow of the printing processing.

FIG. 12 is a sequence chart illustrating an example of the flow of the printing processing, in particular, a sequence chart illustrating an example of notification processing executed each time a job state changes.

DESCRIPTION OF EMBODIMENTS

Figure 1:
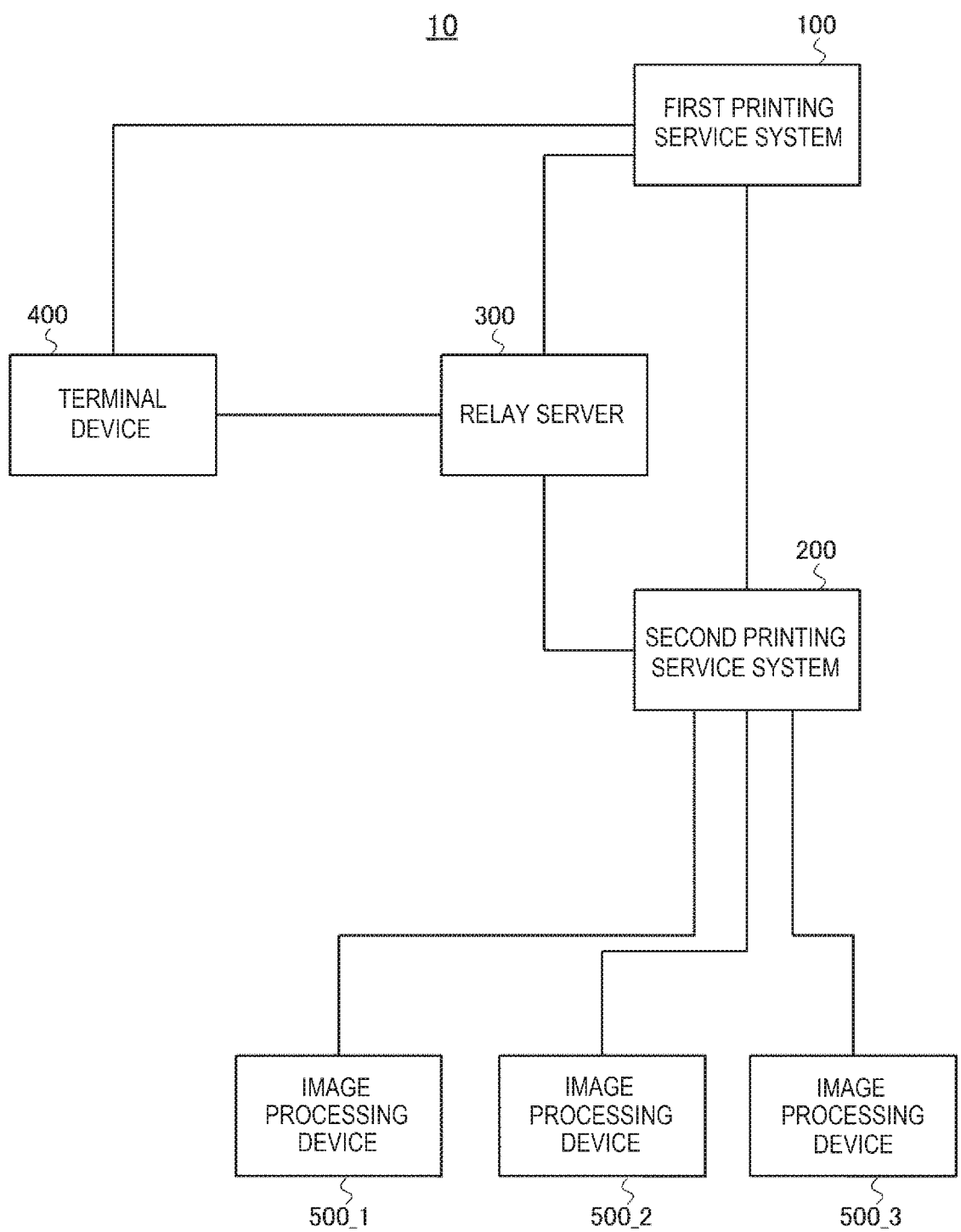
FIG. 1 is a block diagram illustrating a configuration example of a printing system according to an embodiment.

Hereinafter, embodiments will be described with reference to the drawings. To clarify description, the following description and drawings may be omitted and simplified as appropriate. In the drawings, the same elements are denoted by the same reference numerals, and repetitive description thereof is omitted as necessary.

FIG. 1 is a block diagram illustrating a configuration example of a printing system 10 according to an embodiment. The printing system 10 includes a first printing service system 100, a second printing service system 200, and a relay server 300. FIG. 1 also illustrates a terminal device 400 and image processing devices 500_1, 500_2, and 500_3, and the terminal device 400 and the image processing devices 500_1, 500_2, and 500_3 are communicably connected to the printing system 10.

In the following description, the image processing devices 500_1, 500_2, and 500_3 are referred to as an image processing device 500 when the devices are not particularly distinguished from one another. A system including the terminal device 400 may be referred to as the printing system 10. Similarly, a system including the image processing device 500 may be referred to as the printing system 10.

The first printing service system 100 and the second printing service system 200 are systems that provide printing services on a cloud. The first printing service system 100 is a system related to a service provided by a first vendor, and the second printing service system 200 is a system related to a service provided by a second vendor different from the first vendor. For example, the second vendor is a vendor that manufactures the image processing device 500. The image processing device 500 is a device having a function of performing printing processing, and specifically is a printer in the embodiment. In the embodiment, the image processing device 500 is registered in the second printing service system 200 in advance as a device capable of executing printing processing of a printing job managed by the second printing service system 200. The terminal device 400 is a client terminal such as a personal computer (PC), a smartphone, or a tablet terminal. The relay server 300 is a server that serves as a bridge between the first printing service system 100 and the second printing service system 200, and relays processing in the printing system 10.

As illustrated in FIG. 1, the first printing service system 100 and the second printing service system 200 are communicably connected to each other. The relay server 300 is communicably connected to the first printing service system 100 and the second printing service system 200. The image processing device 500 is communicably connected to the second printing service system 200. The terminal device 400 is communicably connected to at least the first printing service system 100 and the relay server 300. In addition to the above-described connection relationships, more connection relationships may be established between components. For example, the terminal device 400 may be communicably connected to the second printing service system 200. Although three image processing devices 500 are illustrated as an example in FIG. 1, the number of the image processing devices 500 using the printing system 10 may be freely set. Similarly, although one terminal device 400 is illustrated as an example, the number of the terminal device 400 using the printing system may be freely set.

As described above, both the first printing service system 100 and the second printing service system 200 are systems that provide printing services on a cloud. Therefore, when a printer is registered in a printing service system, the printer can perform printing via the printing service system. For example, printing based on an instruction from the terminal device 400 can be performed by a printer registered in a printing service system. However, when the printer is not a printer of a model compatible with a protocol used by the printing service system, the printer cannot be directly registered in the printing service system. In the embodiment, the image processing device 500 is compatible with a protocol used by the second printing service system 200, and can be directly registered in the second printing service system 200. On the other hand, the image processing device 500 is not necessarily compatible with a protocol used by the first printing service system 100.

In the embodiment, a printer registered as a virtual printer (a virtual device) in the first printing service system 100 is associated with the image processing device 500 registered in the second printing service system 200, so that printing can be performed by the image processing device 500 via the first printing service system 100. Such an association is performed by the relay server 300. That is, the image processing device 500 is substantially registered in the first printing service system 100 by using the relay server 300. Although the image processing device 500 owned by a user at home or the like is a printer of a model that is not compatible with a protocol of the first printing service system 100, the user may want to perform printing using the image processing device 500 by using a printing service provided by the first printing service system 100. Examples of such a case include a case where installation of a printer driver of the image processing device 500 required in the second printing service system 200 is not necessary in the first printing service system 100. Of course, the user may want to perform printing using the image processing device 500 by using the first printing service system 100 for any other reason. In such a case, the image processing device 500 needs to be substantially registered in the first printing service system 100 by using the relay server 300. The first printing service system 100 provides a printing service using, for example, Internet printing protocol shared infrastructure extensions (IPP-Infra) as the protocol described above, and the second printing service system 200 provides a printing service without using the protocol.

Next, configurations of the first printing service system 100, the second printing service system 200, the relay server 300, the terminal device 400, and the image processing device 500 will be described.

Figure 2:
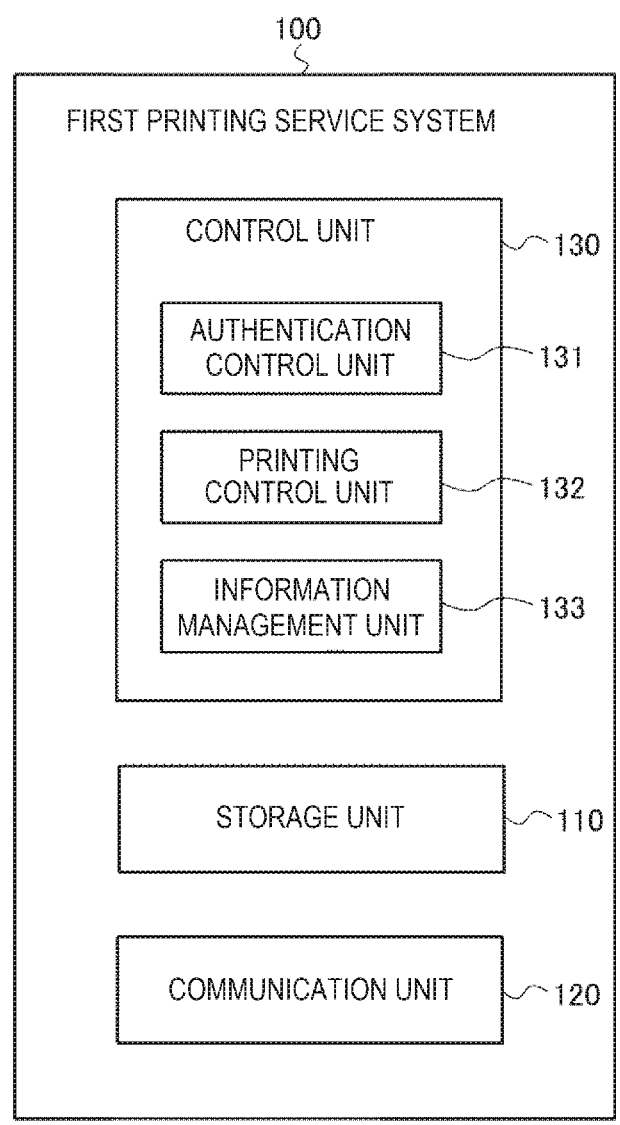
FIG. 2 is a block diagram illustrating a configuration example of a first printing service system according to the embodiment.

FIG. 2 is a block diagram illustrating a configuration example of the first printing service system 100. Although the first printing service system 100 is implemented by one server in the example illustrated in FIG. 2, the first printing service system 100 may be implemented by a plurality of servers.

As illustrated in FIG. 2, the first printing service system 100 includes a storage unit 110, a communication unit 120, and a control unit 130.

The storage unit 110 is a storage device that stores a program for realizing processing of the control unit 130 and data to be used in processing of the first printing service system 100. The storage device may be a nonvolatile storage device such as a hard disk or a flash memory, or may include a memory such as a random access memory (RAM). The storage unit 110 may include a database. The communication unit 120 is a communication interface for communicating with other devices such as the second printing service system 200, the relay server 300, and the terminal device 400 via a wireless network or a wired network. The control unit 130 is a processor such as a central processing unit (CPU) that controls components of the first printing service system 100. The control unit 130 may include a plurality of processors. The control unit 130 reads a program into a memory and executes the program. Accordingly, the control unit 130 implements functions of an authentication control unit 131, a printing control unit 132, and an information management unit 133.

The authentication control unit 131 performs various kinds of processing related to authentication of a user who uses the first printing service system 100. A user of the first printing service system 100 includes a user serving as an administrator and a user serving as a general user who is not an administrator. A user serving as an administrator can also be referred to as a user having an administrator right. A user serving as a general user may also be referred to as a user having a user right that is a right more restricted than the administrator right. In the embodiment, such users are registered in the first printing service system 100 in advance. The authentication control unit 131 provides a page for authentication on a web browser 451 to be described later, performs authentication for an administrator or a general user, and issues a token necessary for accessing predetermined information managed by the first printing service system 100. Specific processing of the authentication control unit 131 in the embodiment will be described using a sequence chart to be described later.

The printing control unit 132 executes control processing for a printer registered in the first printing service system 100 to perform printing. In the embodiment, the printing control unit 132 executes control processing when the image processing device 500 corresponding to a virtual printer registered in the first printing service system 100 performs printing, and the printing control unit 132 may execute control processing when, instead of a virtual printer, a physical printer directly registered in the first printing service system 100 performs printing. Specifically, in the embodiment, the printing control unit 132 executes processing of receiving a printing request from the terminal device 400, processing of transmitting information required to perform printing according to the printing request to the relay server 300, processing of notifying the terminal device 400 of a job state and a printer state, and the like. Specific processing of the printing control unit 132 in the embodiment will be described using a sequence chart to be described later.

The information management unit 133 executes processing of registering a printer in the first printing service system 100. The information management unit 133 manages information related to a user registered in the first printing service system 100 and information related to a printer registered in the first printing service system 100. In the embodiment, the information management unit 133 particularly manages, for example, a printer name, a printer ID, capability information, and sharing information of a registered printer as the information related to a printer. Various kinds of information related to a printer are referred to as attribute information. The information management unit 133 may further execute processing of registering a user in the first printing service system 100. Specific processing of the information management unit 133 in the embodiment will be described using a sequence chart to be described later.

Figure 3:
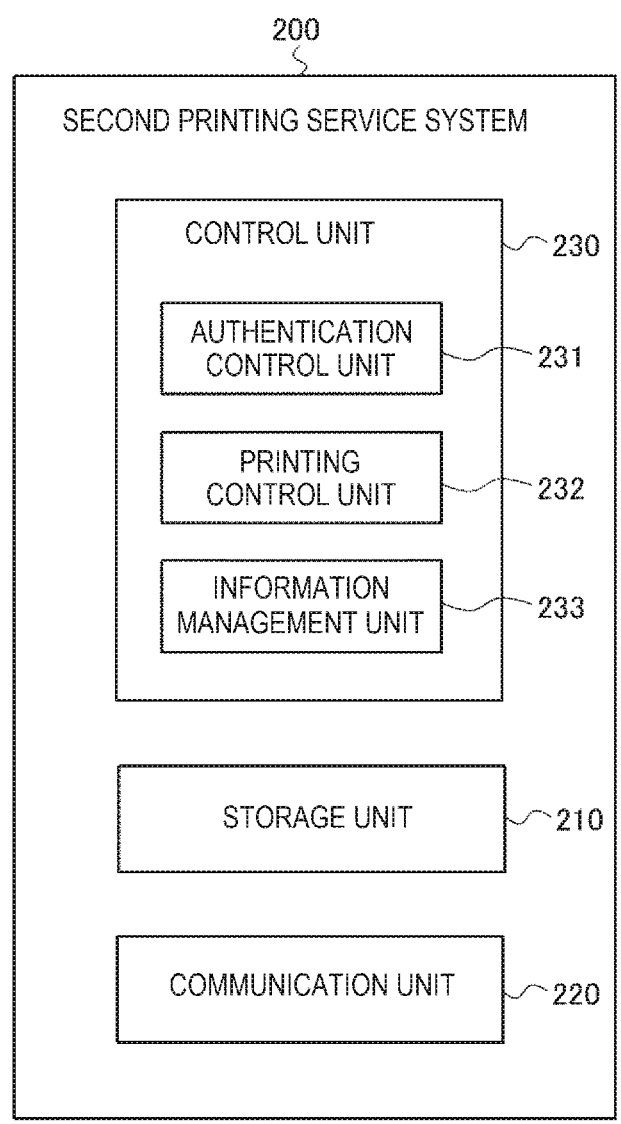
FIG. 3 is a block diagram illustrating a configuration example of a second printing service system according to the embodiment.

FIG. 3 is a block diagram illustrating a configuration example of the second printing service system 200. Although the second printing service system 200 is implemented by one server in the example illustrated in FIG. 3, the second printing service system 200 may be implemented by a plurality of servers.

As illustrated in FIG. 3, the second printing service system 200 includes a storage unit 210, a communication unit 220, and a control unit 230.

The storage unit 210 is a storage device that stores a program for realizing processing of the control unit 230 and data to be used in processing of the second printing service system 200. The storage device may be a nonvolatile storage device such as a hard disk or a flash memory, and may include a memory such as a RAM. The storage unit 210 may include a database. The communication unit 220 is a communication interface for communicating with other devices such as the first printing service system 100, the relay server 300, and the image processing device 500 via a wireless network or a wired network. The control unit 230 is a processor such as a CPU that controls components of the second printing service system 200. The control unit 230 may include a plurality of processors. The control unit 230 reads a program into a memory and executes the program. Accordingly, the control unit 230 implements functions of an authentication control unit 231, a printing control unit 232, and an information management unit 233.

The authentication control unit 231 executes various kinds of processing related to authentication. For example, the authentication control unit 231 executes processing related to authentication for a printer registered in the second printing service system 200 and processing of issuing a token necessary for accessing predetermined information managed by the second printing service system 200. Specific processing of the authentication control unit 231 in the embodiment will be described using a sequence chart to be described later.

The printing control unit 232 executes control processing for the image processing device 500 that is a printer registered in the second printing service system 200 to perform printing. Specifically, in the embodiment, the printing control unit 232 executes processing of receiving a printing request from the relay server 300, processing of transmitting information necessary for performing printing according to the printing request to the image processing device 500, processing of notifying the relay server 300 of a job state, and the like. Specific processing of the printing control unit 232 in the embodiment will be described using a sequence chart to be described later.

The information management unit 233 manages information registered in the second printing service system 200. In particular, in the embodiment, the information management unit 233 manages information related to the image processing device 500 that is a printer registered in the second printing service system 200. In particular, in the embodiment, the information management unit 233 manages, for example, attribute information such as a printer name and capability information of the registered image processing device 500 as information related to the image processing device 500, that is, information related to a printer. The information management unit 233 may execute processing of registering the image processing device 500 in the second printing service system 200. Specific processing of the information management unit 233 in the embodiment will be described using a sequence chart to be described later.

Figure 4:
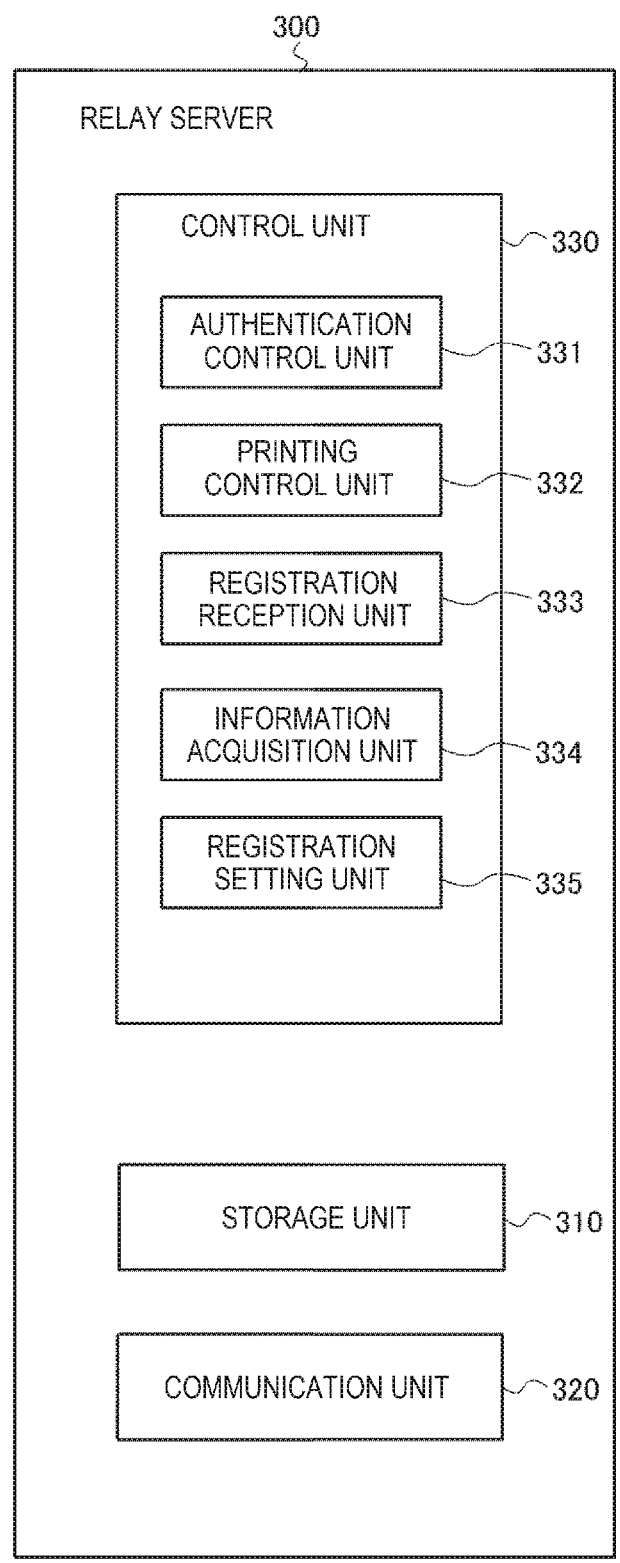
FIG. 4 is a block diagram illustrating a configuration example of a relay server according to the embodiment.

FIG. 4 is a block diagram illustrating a configuration example of the relay server 300. Although the relay server 300 is implemented by one server in the example illustrated in FIG. 4, the relay server 300 may be implemented by a plurality of servers. The relay server 300 may be referred to as a server.

As illustrated in FIG. 4, the relay server 300 includes a storage unit 310, a communication unit 320, and a control unit 330.

The storage unit 310 is a storage device that stores a program for realizing processing of the control unit 330 and data to be used in processing of the relay server 300. The storage device may be a nonvolatile storage device such as a hard disk or a flash memory, and may include a memory such as a RAM. The storage unit 310 may include a database. The storage unit 310 stores, for example, an administrator access token and a refresh token that are credential information about an administrator, a correspondence relationship between a virtual printer and the image processing device 500, a correspondence relationship between a printing job of the first printing service system 100 and a printing job of the second printing service system 200, and a registration user ID to be described later. The communication unit 320 is a communication interface for communicating with other devices such as the first printing service system 100, the second printing service system 200, and the terminal device 400 via a wireless network or a wired network. The control unit 330 is a processor such as a CPU that controls components of the relay server 300. The control unit 330 may include a plurality of processors. The control unit 330 reads a program into a memory and executes the program. Accordingly, the control unit 330 implements functions of an authentication control unit 331, a printing control unit 332, a registration reception unit 333, an information acquisition unit 334, and a registration setting unit 335.

The authentication control unit 331 executes various kinds of processing to receive authentication by the first printing service system 100 and various kinds of processing to receive authentication by the second printing service system 200. Specifically, the authentication control unit 331 executes processing of acquiring a token (an administrator access token, a refresh token) necessary for accessing predetermined information managed by the first printing service system 100 and processing of acquiring a token necessary for accessing predetermined information managed by the second printing service system 200. Specific processing of the authentication control unit 331 in the embodiment will be described using a sequence chart to be described later.

The printing control unit 332 performs control processing for the image processing device 500 to perform printing, the image processing device 500 being a printer registered in the second printing service system 200, that is, a printer registered in the first printing service system 100 using a virtual printer. The printing control unit 332 executes processing of acquiring information required for printing from the first printing service system 100, processing of transmitting a printing request to the second printing service system 200 based on the acquired information, processing of notifying the first printing service system 100 of a job state and a printer state, and the like. Specific processing of the printing control unit 332 in the embodiment will be described using a sequence chart to be described later.

As will be described later with reference to a sequence chart, the printing control unit 332 has a function of acquiring a job state about printing processing executed by the image processing device 500 from the second printing service system 200. Therefore, focusing on this function, the printing control unit 332 may be referred to as an acquisition unit. As will be described later using a sequence chart, the printing control unit 332 has a function of transmitting a job state to the first printing service system 100 when the job state is acquired from the second printing service system 200 and a function of transmitting a state of the image processing device 500 to the first printing service system 100. Therefore, focusing on these functions, the printing control unit 332 may be referred to as a transmission unit. Further, as will be described later using a sequence chart, the printing control unit 332 has a function of determining a state of the image processing device 500 based on the job state acquired from the second printing service system 200. Therefore, focusing on this function, the printing control unit 332 may be referred to as a device state determination unit.

The registration reception unit 333 executes processing of acquiring a registration instruction for instructing to register the image processing device 500 in the first printing service system 100. Specific processing of the registration reception unit 333 in the embodiment will be described using a sequence chart to be described later.

The information acquisition unit 334 executes processing of acquiring user information from the first printing service system 100. In the embodiment, the information acquisition unit 334 acquires, for example, a user name that is a name of a user managed by the first printing service system 100 as the user information. The information acquisition unit 334 executes processing of acquiring printer information that is information about the image processing device 500 from the second printing service system 200. In the embodiment, the information acquisition unit 334 acquires, for example, a printer name that is a name of the image processing device 500 managed by the second printing service system 200 as the information about the image processing device 500. Specific processing of the information acquisition unit 334 in the embodiment will be described using a sequence chart to be described later. The registration setting unit 335 executes processing of registering the image processing device 500 in the first printing service system 100. Focusing on this function, the registration setting unit 335 may be referred to as a registration unit. In the embodiment, specifically, the registration setting unit 335 registers the image processing device 500 in the first printing service system 100 by executing processing of registering a virtual printer associated with the image processing device 500 in the first printing service system 100. When the image processing device 500 is registered in the first printing service system 100, the registration setting unit 335 executes processing of setting information managed by the first printing service system 100, that is, attribute information related to the image processing device 500. Focusing on this function, the registration setting unit 335 may be referred to as a setting unit. In the embodiment, the first printing service system 100 executes registration processing only in response to a registration request with an administrator right, and does not permit registration in response to a registration request without an administrator right. In the embodiment, the first printing service system 100 executes attribute information setting processing only in response to a setting request with an administrator right, and does not permit setting in response to a setting request without an administrator right. Therefore, the registration setting unit 335 executes processing of registering the image processing device 500 in the first printing service system 100 using credential information corresponding to an administrator right. Similarly, the registration setting unit 335 executes processing of setting attribute information managed by the first printing service system 100 using credential information corresponding to an administrator right. In particular, as will be described later, when the registration reception unit 333 acquires a registration instruction from a general user, the registration setting unit 335 performs the above-described processing using credential information corresponding to an administrator that is stored in the storage unit 310 in advance. Although the administrator right is required to execute the registration processing in the embodiment as described above, the administrator right is not necessarily required. Specific processing of the registration setting unit 335 in the embodiment will be described using a sequence chart to be described later.

Figure 5:
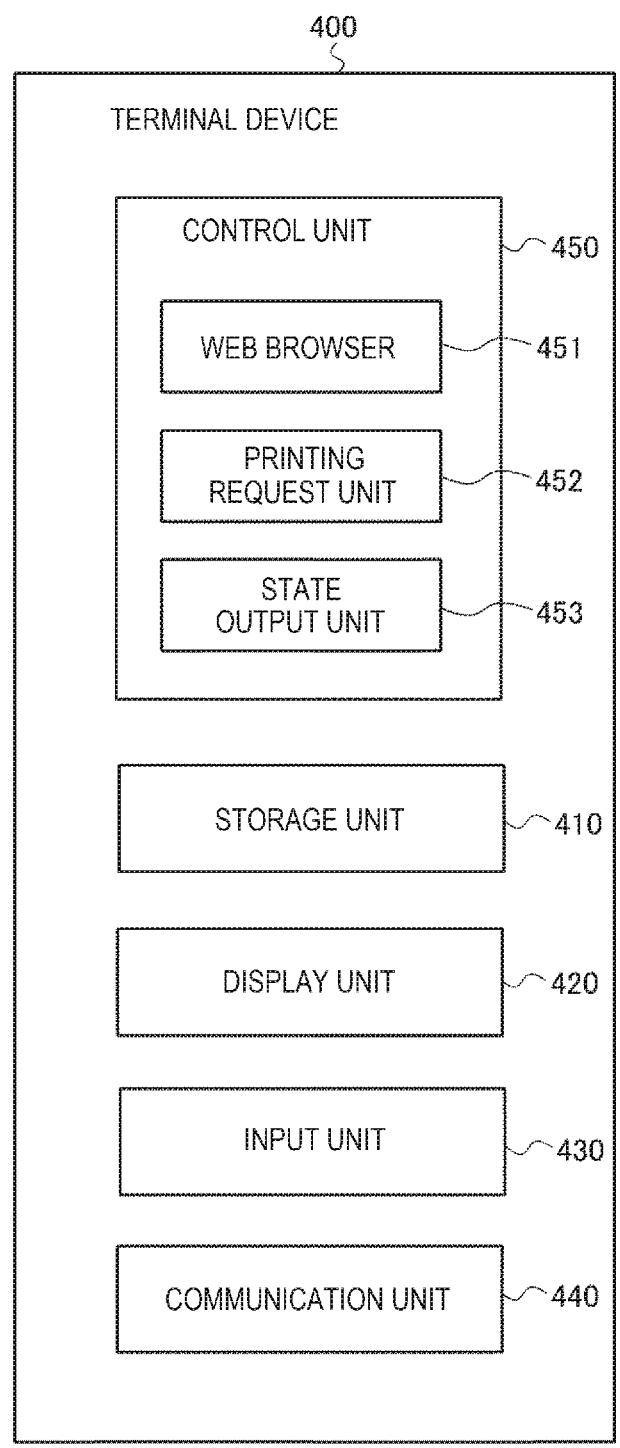
FIG. 5 is a block diagram illustrating a configuration example of a terminal device according to the embodiment.

FIG. 5 is a block diagram illustrating a configuration example of the terminal device 400. As illustrated in FIG. 5, the terminal device 400 includes a storage unit 410, a display unit 420, an input unit 430, a communication unit 440, and a control unit 450.

The storage unit 410 is a storage device that stores a program for realizing processing of the control unit 450 and data to be used in processing of the terminal device 400. The storage device may be a nonvolatile storage device such as a hard disk or a flash memory, and may include a memory such as a RAM. The display unit 420 is a device for displaying information, and is, for example, a display such as a flat panel display. The input unit 430 is a device that receives an input operation from a user, and is, for example, a keyboard or a mouse. The display unit 420 and the input unit 430 may be integrally implemented by a touch panel or the like. The communication unit 440 is a communication interface for communicating with other devices such as the first printing service system 100 and the relay server 300 via a wireless network or a wired network. The control unit 450 is a processor such as a CPU that controls components of the terminal device 400. The control unit 450 may include a plurality of processors. The control unit 450 reads a program into a memory and executes the program. Accordingly, the control unit 450 implements functions of a web browser 451, a printing request unit 452, and a state output unit 453.

The web browser 451 is a known web browser, and in the embodiment, the web browser 451 executes processing of displaying a web page provided by the first printing service system 100, the relay server 300, or the like on the display unit 420, processing of transmitting information input to the displayed web page, and the like. Specific processing of the web browser 451 according to the embodiment will be described using a sequence chart to be described later.

The printing request unit 452 executes processing of requesting printing in response to an operation from a user. In the embodiment, in particular, the printing request unit 452 requests the first printing service system 100 to perform printing. Specific processing of the printing request unit 452 in the embodiment will be described using a sequence chart to be described later.

The state output unit 453 acquires a job state and a printer state to be described later via the first printing service system 100, and executes processing of outputting the job state and the printer state. Although the state output unit 453 outputs a job state and a printer state to the display unit 420 in the embodiment, the states are not necessarily output by displaying. For example, the state output unit 453 may output the job state and the printer state by voice or the like. Specific processing of the state output unit 453 according to the embodiment will be described using a sequence chart to be described later.

Figure 6:
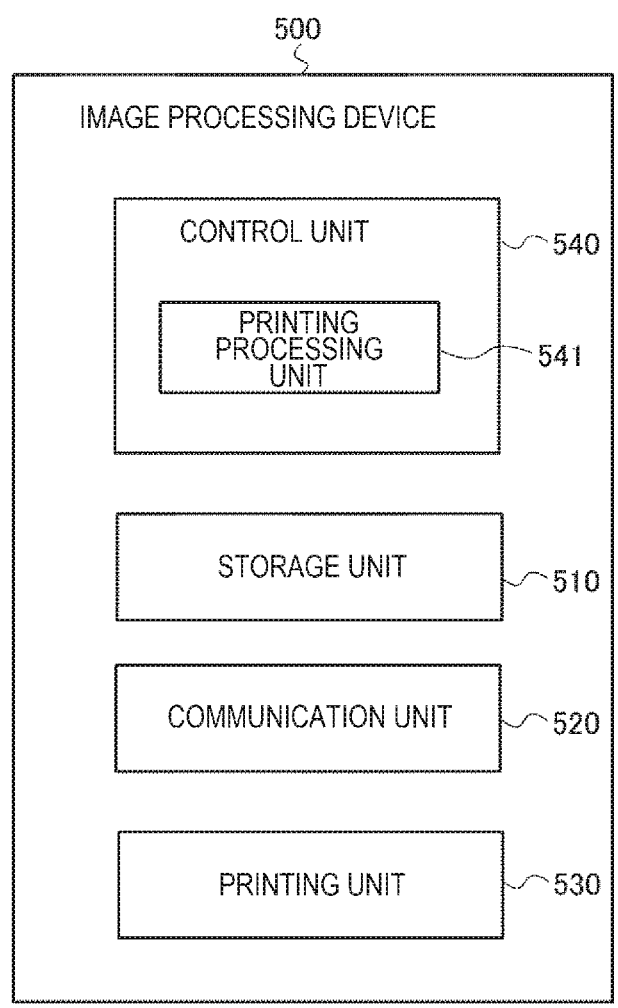
FIG. 6 is a block diagram illustrating a configuration example of an image processing device according to the embodiment.

FIG. 6 is a block diagram illustrating a configuration example of the image processing device 500. As illustrated in FIG. 6, the image processing device 500 includes a storage unit 510, a communication unit 520, a printing unit 530, and a control unit 540.

The storage unit 510 is a storage device that stores a program for realizing processing of the control unit 540 and data to be used in processing of the image processing device 500. The storage device may be a nonvolatile storage device such as a hard disk or a flash memory, and may include a memory such as a RAM. The communication unit 520 is a communication interface for communicating with other devices such as the second printing service system 200 via a wireless network or a wired network. The control unit 540 is a processor such as a CPU that controls components of the image processing device 500. The control unit 540 may include a plurality of processors. The control unit 540 reads a program into a memory and executes the program. Accordingly, the control unit 540 implements a function of the printing processing unit 541.

The printing processing unit 541 executes processing for performing printing by the printing unit 530. The printing processing unit 541 notifies the second printing service system 200 of a job state of a printing job. Specific processing of the printing processing unit 541 in the embodiment will be described using a sequence chart to be described later.

The printing unit 530 has a printing function for forming an image on a printing medium such as paper. The printing unit 530 includes a printing engine. The printing engine is a mechanical configuration that prints an image on a printing medium using a color material. The printing engine may include, for example, a mechanism that performs printing using ink by an ink jet method. Alternatively, the printing engine may include, for example, a mechanism that performs printing using toner by an electrophotographic method. The printing engine may include a conveyance mechanism that conveys the printing medium.

The image processing device 500 may further include a user interface such as a touch panel display. In the embodiment, as described above, the image processing device 500 includes the printing unit 530 and has a function as a printer. Therefore, the image processing device 500 is also referred to as a printer.

Next, a processing flow of the printing system 10 will be described using sequence charts.

Figure 7:
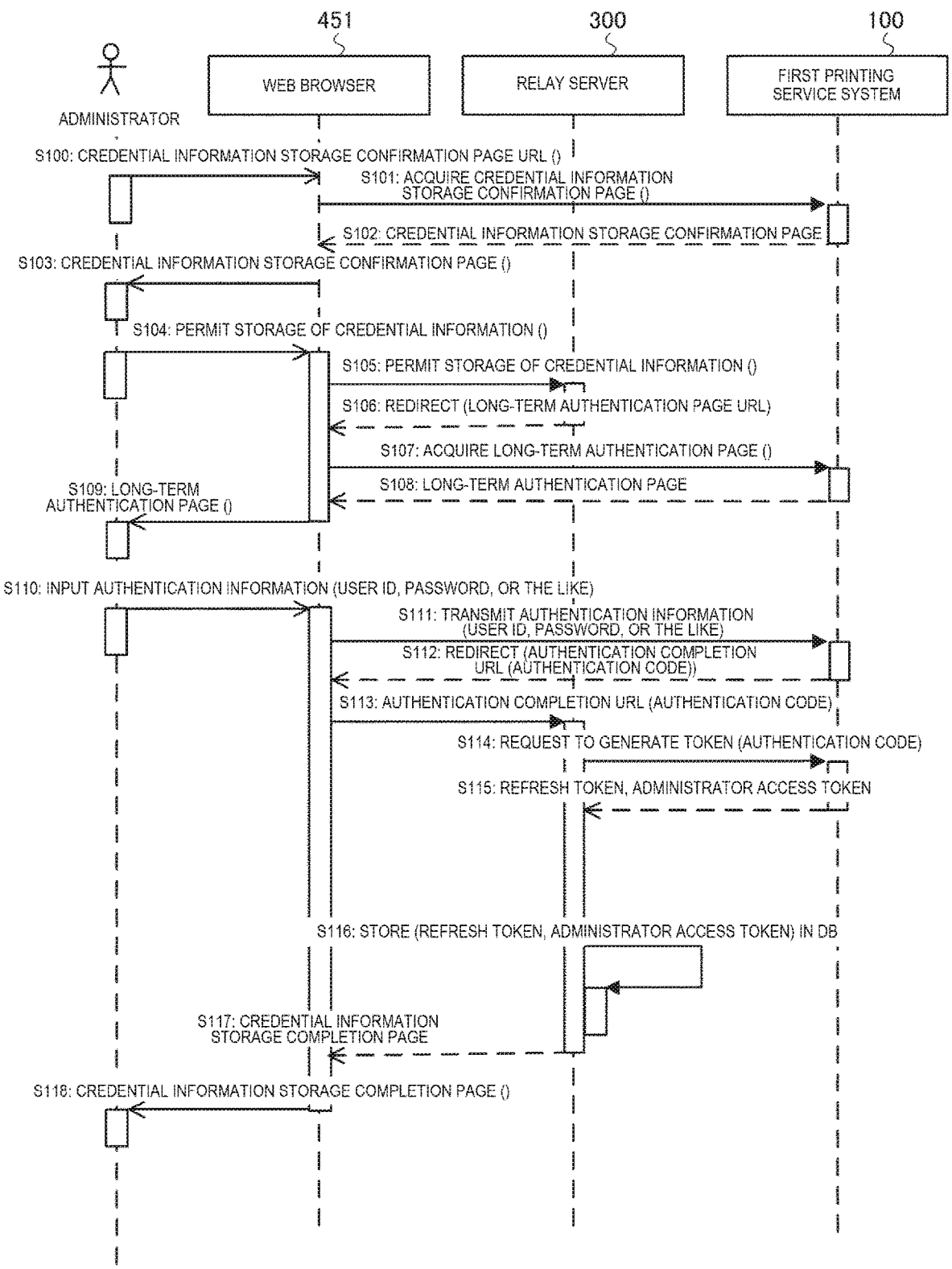
FIG. 7 is a sequence chart illustrating an example of a flow of credential information storing processing.

First, a processing flow of storing, in the relay server 300, credential information for acquiring a permission for a predetermined request to the first printing service system 100 will be described. FIG. 7 is a sequence chart illustrating an example of a flow of credential information storing processing executed in the printing system 10. An order of processing steps in the sequence chart is merely an example, and can be appropriately changed as long as there is no technical contradiction. Hereinafter, the flow of the credential information storing processing will be described with reference to FIG. 7.

In step S100, an administrator registered in the first printing service system 100 performs a predetermined operation of requesting storage of credential information via the input unit 430 of the terminal device 400. Accordingly, for example, a uniform resource locator (URL) of a credential information storage confirmation page is input to the web browser 451 of the terminal device 400. Here, the credential information storage confirmation page is a page for confirming whether storage of the credential information may be actually performed. For example, the credential information storage confirmation page may be a page including a button for instructing whether to store the credential information. Since the storage of the credential information leads to availability of an administrator right for a long period of time, the printing system 10 inquires a user about an intention to store the credential information by using the credential information storage confirmation page, thereby confirming that the operation is not an erroneous operation of the user. After step S100, in step S101, the web browser 451 transmits, to the first printing service system 100, a request to acquire the credential information storage confirmation page according to the input URL. In response to this, in step S102, the authentication control unit 131 of the first printing service system 100 transmits the credential information storage confirmation page to the web browser 451. Accordingly, in step S103, the web browser 451 displays the credential information storage confirmation page on the display unit 420 of the terminal device 400.

Although processing for confirming whether the storage of the credential information may be actually performed is performed in the example illustrated in FIG. 7, this processing may be omitted. In this case, an operation in step S104 to be described below corresponds to an operation of requesting storage of the credential information.

In step S104, the administrator inputs an instruction to permit the storage of the credential information to the credential information storage confirmation page via the input unit 430. That is, the administrator inputs, to the web browser 451, an instruction indicating that the intention to store the credential information is not an error. When such an instruction is input, in step S105, the web browser 451 transmits an instruction to permit the storage of the credential information to the relay server 300. In response to this, in step S106, the authentication control unit 331 of the relay server 300 instructs the web browser 451 to access a predetermined redirect page. In this step, the predetermined redirect page is a long-term authentication page. Therefore, the authentication control unit 331 of the relay server 300 transmits a URL of the long-term authentication page to the web browser 451. The long-term authentication page is a page for requesting a user to input administrator authentication information when the credential information is to be stored for a long period of time. In step S107, the web browser 451 transmits, to the first printing service system 100, a request to acquire the long-term authentication page according to the received URL. In response to this, in step S108, the authentication control unit 131 of the first printing service system 100 transmits the long-term authentication page to the web browser 451. Accordingly, in step S109, the web browser 451 displays the long-term authentication page on the display unit 420 of the terminal device 400.

In step S110, the administrator inputs authentication information to the long-term authentication page via the input unit 430. Specifically, for example, the administrator inputs a user ID of the administrator, a password, or the like. Here, required authentication information is authentication information used in the first printing service system 100, and specifically, the required authentication information is a user ID, a password, and the like that are registered in advance. In step S111, the web browser 451 transmits the input authentication information to the first printing service system 100. The authentication control unit 131 of the first printing service system 100 executes authentication processing based on the authentication information received from the web browser 451. That is, the authentication control unit 131 determines whether the received authentication information matches administrator authentication information registered in advance.

When the authentication is successful in the authentication processing, that is, when the received authentication information matches the administrator authentication information registered in advance, in step S112, the authentication control unit 131 of the first printing service system 100 issues an authentication code and further instructs the web browser 451 to access a predetermined redirect destination. The predetermined redirect destination is the relay server 300. The authentication code is passed to the relay server 300 by such redirecting. Therefore, the authentication control unit 131 of the first printing service system 100 transmits a URL indicating the predetermined redirect destination together with the authentication code to the web browser 451.

In step S113, the web browser 451 accesses the predetermined redirect destination together with the authentication code. Accordingly, the relay server 300 acquires the authentication code. In step S114, the authentication control unit 331 of the relay server 300 transmits a request for requesting generation of a token to the first printing service system 100 together with the received authentication code. The authentication control unit 131 of the first printing service system 100 issues credential information only when a request with a predetermined authentication code is received. In step S115, the authentication control unit 131 confirms that the authentication code received in step S114 matches the authentication code transmitted in step S112, and then issues credential information, and transmits the credential information to the relay server 300. Specifically, the authentication control unit 131 issues an administrator access token and a refresh token, and transmits the tokens to the relay server 300. Accordingly, the authentication control unit 331 of the relay server 300 acquires the administrator access token and the refresh token.

The administrator access token is information for certifying that an access is a valid access of an administrator. In the embodiment, more specifically, the administrator access token is information for certifying that an access is a valid access of an administrator when a user accesses predetermined information managed by the first printing service system 100. A validity period of the administrator access token is limited to a predetermined short period. For example, the validity period of the administrator access token is about several hours after the administrator access token is issued. The relay server 300 transmits the authentication code in order to issue the administrator access token in the above description, and more specifically, the relay server 300 may further transmit authentication information that is referred to as a client secret.

The refresh token is information for updating the administrator access token, and a validity period of the refresh token is a predetermined period longer than the validity period of the administrator access token. For example, the validity period of the refresh token may be several days or may be an indefinite period. As will be described later, a new administrator access token and a new refresh token are issued when a valid refresh token is transmitted to the first printing service system 100.

In the embodiment, the administrator access token and the refresh token are examples of credential information. The credential information may refer to only one of the administrator access token and the refresh token. As described above, information directly required to access predetermined information managed by the first printing service system 100 is the administrator access token. Therefore, in particular, the credential information may refer to only the administrator access token. A validity period of the administrator access token is not necessarily limited to a short period. The validity period of the administrator access token may be an indefinite period. Further, when the validity period of the administrator access token is sufficiently long, the refresh token may not be used in the embodiment.

Description of the sequence chart illustrated in FIG. 7 will be continued. After step S115, in step S116, the authentication control unit 331 of the relay server 300 stores the credential information acquired in step S115, that is, the refresh token and the administrator access token, in a database of the storage unit 310 or the like. In this manner, the storage unit 310 stores credential information about an administrator, that is, a user having an administrator right. Thereafter, in step S117, the authentication control unit 331 transmits a credential information storage completion page to the web browser 451. The credential information storage completion page is a page for notifying that the credential information is appropriately stored in the relay server 300. Accordingly, in step S118, the web browser 451 displays the credential information storage completion page on the display unit 420 of the terminal device 400.

Next, a processing flow of updating the credential information stored by the relay server 300 will be described. FIG. 8 is a sequence chart illustrating an example of a flow of credential information updating processing executed in the printing system 10. The updating processing illustrated in FIG. 8 is executed, for example, at a predetermined timing. Specifically, for example, the updating processing may be executed to update an administrator access token when printer registration processing is executed, or may be executed periodically (for example, at an interval of one day) to update a refresh token. An order of processing steps in the sequence chart is merely an example, and can be appropriately changed as long as there is no technical contradiction. Hereinafter, the flow of the credential information updating processing will be described with reference to FIG. 8.

In step S200, the authentication control unit 331 of the relay server 300 executes processing of reading a database of the storage unit 310 or the like. Accordingly, in step S201, the authentication control unit 331 reads a refresh token that is currently stored in the database. Next, in step S202, the authentication control unit 331 transmits, to the first printing service system 100, a request for requesting to update a token together with the refresh token that is currently stored in the database.

The authentication control unit 131 of the first printing service system 100 updates credential information only when a request with a valid refresh token is received. In step S203, the authentication control unit 131 confirms that the refresh token received in step S202 is valid, and then updates the credential information, and transmits the updated credential information to the relay server 300. Specifically, the authentication control unit 131 transmits the updated administrator access token and the updated refresh token to the relay server 300. Accordingly, the authentication control unit 331 of the relay server 300 acquires a new administrator access token and a new refresh token. After step S203, in step S204, the authentication control unit 331 of the relay server 300 stores the credential information acquired in step S203, that is, the refresh token and the administrator access token, in a database of the storage unit 310 or the like.

Figure 9A:
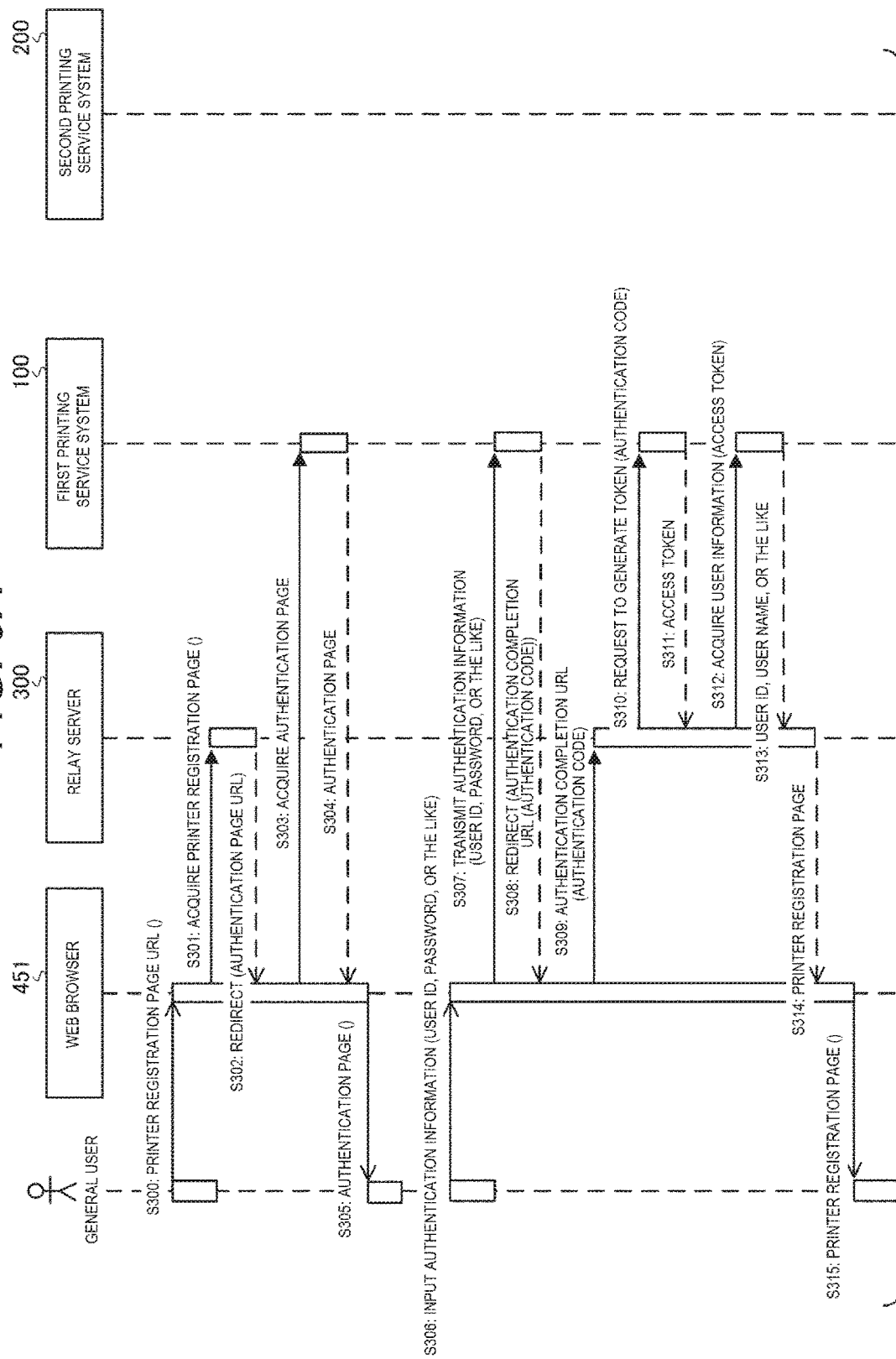
FIG. 9A is a sequence chart illustrating an example of a flow of personal printer registration processing.
Figure 9C:
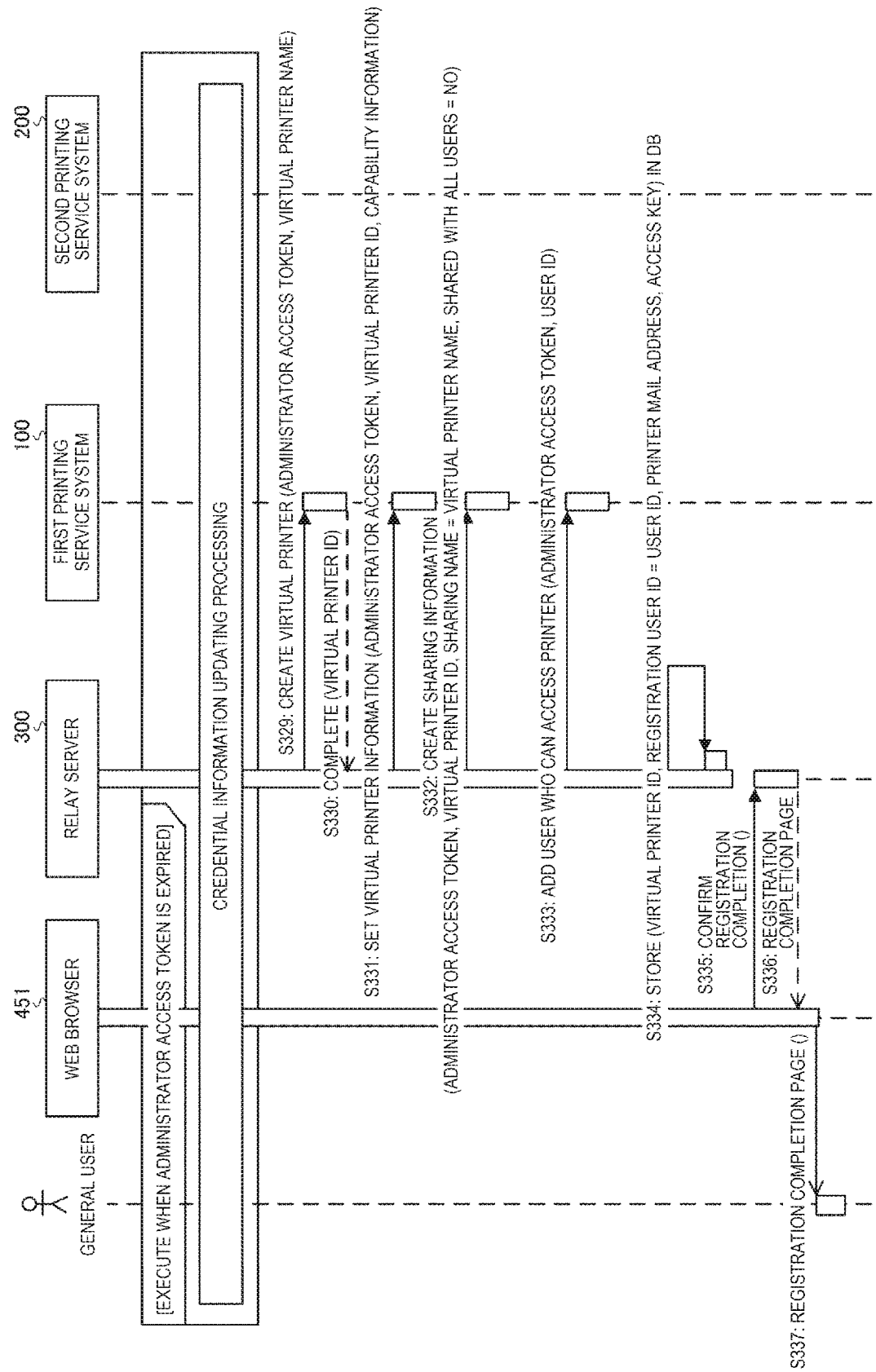
FIG. 9C is a sequence chart illustrating the example of the flow of the personal printer registration processing.
Figure 10A:
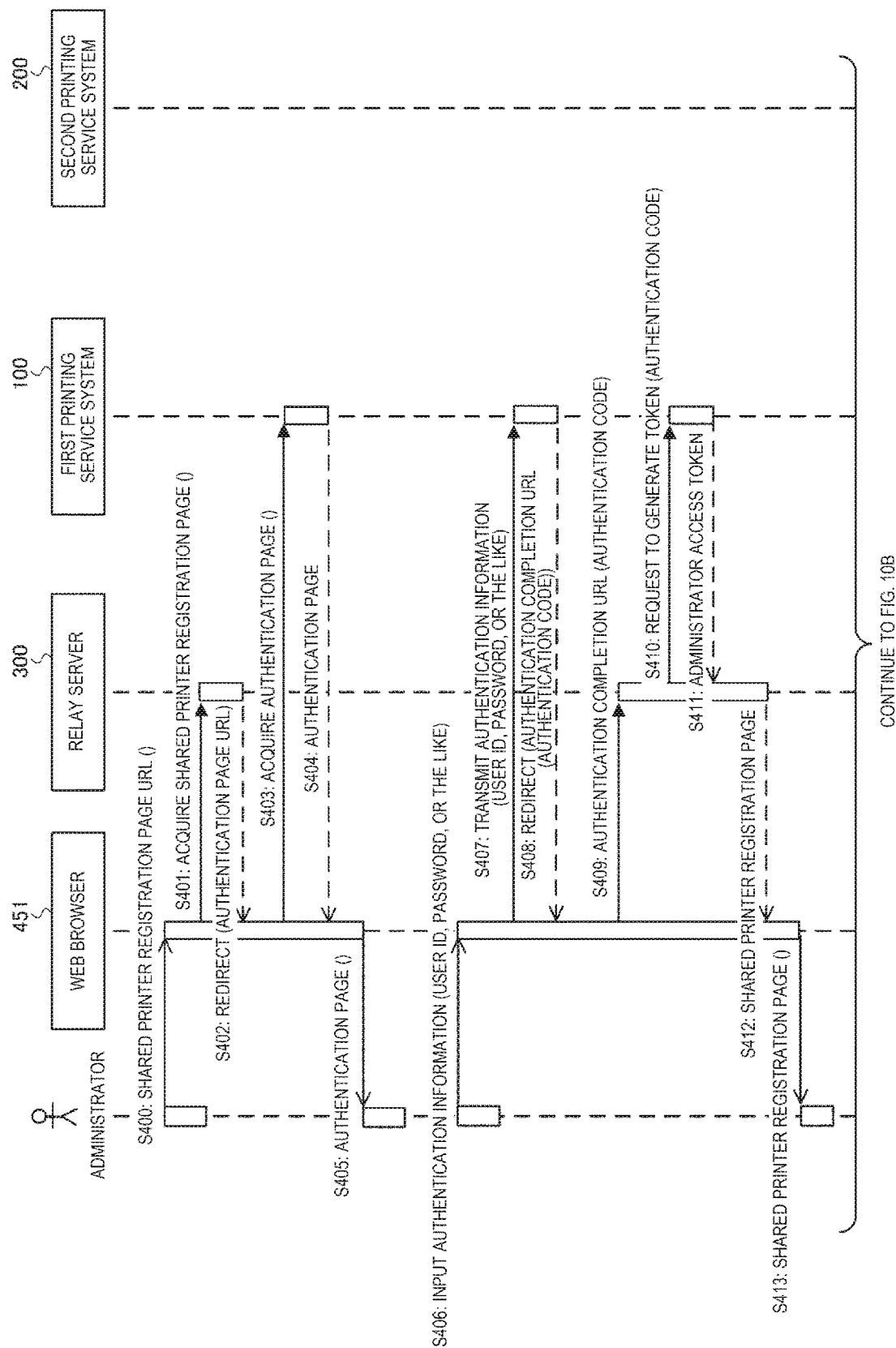
FIG. 10A is a sequence chart illustrating an example of a flow of shared printer registration processing.
Figure 11B:
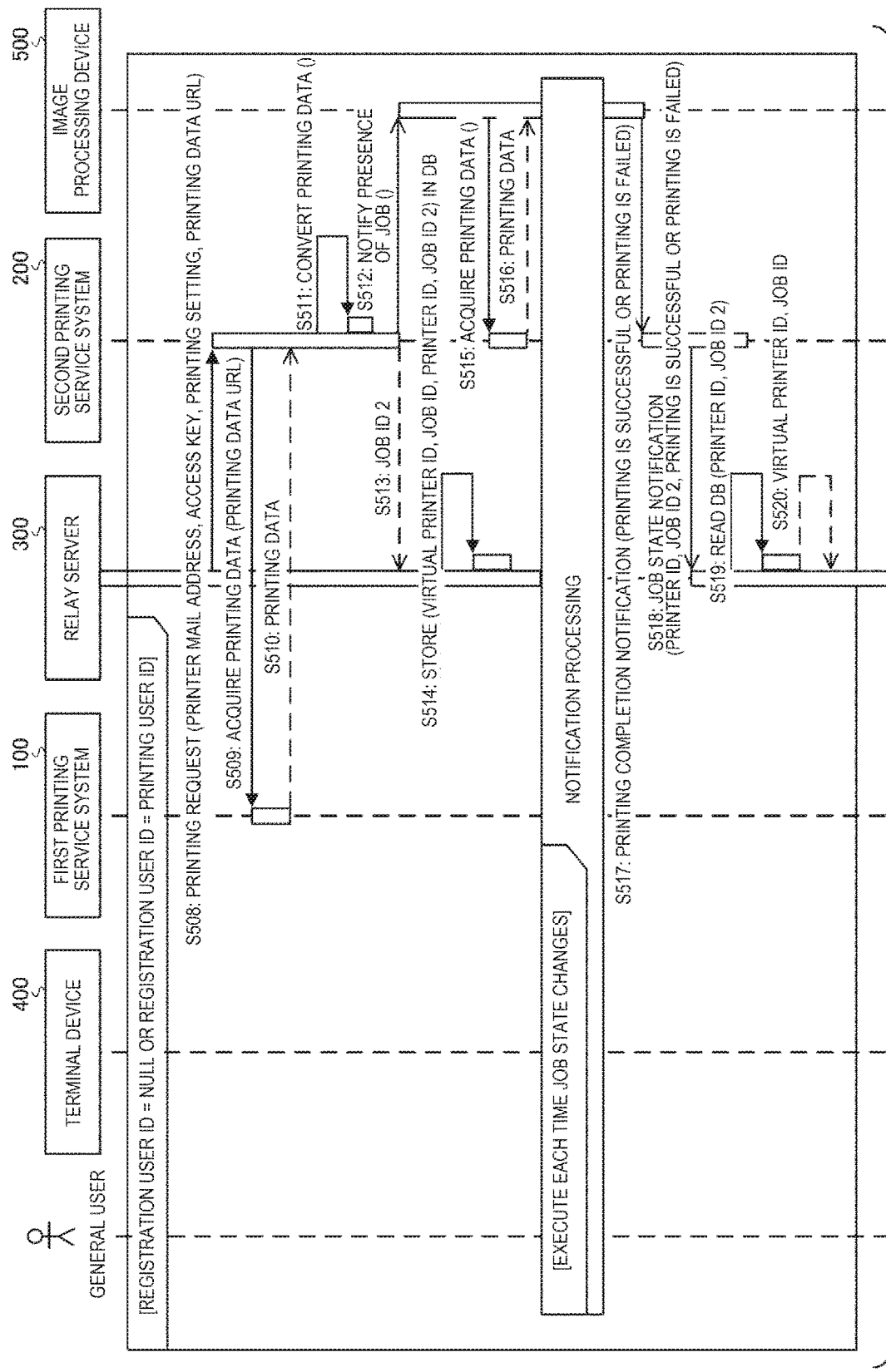
FIG. 11B is a sequence chart illustrating the example of the flow of the printing processing.

Next, a processing flow of registering a personal printer in the first printing service system 100 will be described. FIGS. 9A to 9C are sequence charts illustrating an example of a flow of personal printer registration processing executed in the printing system 10. A personal printer is a printer that is assumed to be used by a specific single user. Therefore, the personal printer can also be referred to as a printer that is scheduled to be used only by a user who performed a registration operation. That is, the personal printer is a printer that is not shared by a plurality of users. An order of processing steps in the sequence charts is merely an example, and can be appropriately changed as long as there is no technical contradiction. The flow of the personal printer registration processing will be described below with reference to FIGS. 9A to 9C.

In step S300, a general user who is not an administrator performs a predetermined operation for starting the personal printer registration processing via the input unit 430 of the terminal device 400. Accordingly, for example, a URL of a printer registration page is input to the web browser 451 of the terminal device 400. The printer registration page is a page prepared to register a personal printer in the first printing service system 100. After step S300, in step S301, the web browser 451 transmits, to the relay server 300, a request to acquire the printer registration page according to the input URL. In response to this, in step S302, the registration reception unit 333 of the relay server 300 instructs the web browser 451 to access a predetermined redirect page. In this step, the predetermined redirect page is an authentication page.

Therefore, the registration reception unit 333 of the relay server 300 transmits a URL of the authentication page to the web browser 451. The authentication page is a page for requesting the user to input authentication information when a printer is to be registered. In step S303, the web browser 451 transmits, to the first printing service system 100, a request to acquire the authentication page according to the received URL. In response to this, in step S304, the authentication control unit 131 of the first printing service system 100 transmits the authentication page to the web browser 451. Accordingly, in step S305, the web browser 451 displays the authentication page on the display unit 420 of the terminal device 400.

In step S306, a general user inputs authentication information to the authentication page via the input unit 430. Specifically, for example, the general user inputs a user ID of the user, a password, or the like. Here, required authentication information is authentication information used in the first printing service system 100, and specifically, the required authentication information is a user ID, a password, and the like that are registered in advance. In step S307, the web browser 451 transmits the input authentication information to the first printing service system 100. The authentication control unit 131 of the first printing service system 100 executes authentication processing based on the authentication information received from the web browser 451. That is, the authentication control unit 131 determines whether the received authentication information matches authentication information of the general user registered in advance.

When the authentication is successful in the authentication processing, that is, when the received authentication information matches the authentication information of the general user registered in advance, in step S308, the authentication control unit 131 of the first printing service system 100 issues an authentication code and further instructs the web browser 451 to access a predetermined redirect destination. The predetermined redirect destination is the relay server 300. The authentication code is passed to the relay server 300 by such redirecting. Therefore, the authentication control unit 131 of the first printing service system 100 transmits a URL indicating the predetermined redirect destination together with the authentication code to the web browser 451.

In step S309, the web browser 451 accesses the predetermined redirect destination together with the authentication code. Accordingly, the relay server 300 acquires the authentication code. In step S310, the authentication control unit 331 of the relay server 300 transmits a request for requesting generation of a token to the first printing service system 100 together with the received authentication code. In step S311, the authentication control unit 131 of the first printing service system 100 confirms that the authentication code received in step S310 matches the authentication code transmitted in step S308, and then issues an access token, and transmits the access token to the relay server 300. The access token is information for certifying that an access is a valid access of a general user, and is referred to as a normal access token in the following description. The normal access token is also a type of credential information, but even when this kind of information is used, access as an administrator is not permitted in the first printing service system 100. Therefore, when an access is performed using the normal access token, among information managed by the first printing service system 100, information requiring an administrator right cannot be accessed. On the other hand, when an access is performed using the normal access token, information that does not require an administrator right can be accessed. In the embodiment, the information acquisition unit 334 of the relay server 300 acquires, using the normal access token, user information of a general user who performs an operation for registering a printer. Therefore, in step S312, the information acquisition unit 334 of the relay server 300 transmits, to the first printing service system 100, a request to acquire the user information of the general user who performs an operation for registering a printer, together with the normal access token acquired in step S311.

In response to this, in step S313, the information management unit 133 of the first printing service system 100 confirms that the access token received in step S312 is valid, and then transmits the user information of the general user to the relay server 300. Specifically, the information management unit 133 transmits a user ID and a user name of the general user managed by the first printing service system 100 to the relay server 300. Accordingly, the information acquisition unit 334 of the relay server 300 acquires the user information. The information acquisition unit 334 of the relay server 300 may store the acquired user information in the storage unit 310 as necessary. Thereafter, in step S314, the registration reception unit 333 transmits the printer registration page to the web browser 451. Accordingly, in step S315, the web browser 451 displays the printer registration page on the display unit 420 of the terminal device 400.

In step S316, the general user performs a predetermined operation of requesting registration of a personal printer while designating a printer to be registered via the input unit 430 of the terminal device 400. Here, the printer to be registered is a printer that is to be newly available for printing via the first printing service system 100. In the embodiment, the printer to be registered is not a printer connected to the first printing service system 100, and is a printer connected to the second printing service system 200, that is, the image processing device 500. The printer is registered in the first printing service system 100 by being associated with a virtual printer registered in the first printing service system 100. In step S316, more specifically, the general user inputs identification information for identifying the printer to be registered to the printer registration page displayed in step S315. For example, the general user inputs identification information of a printer owned by the general user. In the embodiment, for example, the general user inputs a mail address of the printer to be registered as the identification information. That is, the mail address of the printer to be registered is input to the web browser 451 of the terminal device 400. Other pieces of information that can uniquely identify the printer to be registered may be used instead of the mail address.

Next, in step S317, the web browser 451 transmits, to the relay server 300, a request for requesting registration of the printer in the first printing service system 100 together with the mail address of the printer to be registered. Accordingly, the registration reception unit 333 acquires a registration instruction of the image processing device 500 from the general user. In response to this, in step S318, the authentication control unit 331 of the relay server 300 transmits the mail address of the printer to be registered to the second printing service system 200 and requests authentication. When there is a printer corresponding to the mail address and an access key such as a password is set in advance for the printer, processing from step S319 to step S324 to be described later is executed, and it is determined that the authentication is successful only when the access key is input. On the other hand, when there is a printer corresponding to the mail address and an access key is not set for the printer, it is determined that the authentication is successful without executing the processing from step S319 to step S324 to be described later. Hereinafter, a case where an access key is set for the printer identified by the mail address will be described.

In step S319, the authentication control unit 231 of the second printing service system 200 requests the relay server 300 to transmit the access key. In response to this, in step S320, the authentication control unit 331 of the relay server 300 transmits an input page for accepting an input of the access key to the web browser 451. Accordingly, in step S321, the web browser 451 displays an access key input page on the display unit 420 of the terminal device 400. Next, in step S322, the general user inputs an access key to the input page via the input unit 430. In step S323, the web browser 451 transmits the input access key to the relay server 300. In step S324, the authentication control unit 331 of the relay server 300 transmits the mail address and the access key of the printer to be registered to the second printing service system 200, and requests authentication again. In response to this, the authentication control unit 231 of the second printing service system 200 performs authentication based on information transmitted from the relay server 300.

When the authentication is successful, in step S325, the authentication control unit 231 of the second printing service system 200 issues a token and transmits the token to the relay server 300. The token is an access token for accessing predetermined information managed by the second printing service system 200. In step S326, the information acquisition unit 334 of the relay server 300 that acquired the token transmitted from the second printing service system 200 transmits, to the second printing service system 200, a request to acquire printer information about the printer to be registered together with the token acquired in step S325.

In response to this, in step S327, the information management unit 233 of the second printing service system 200 confirms that the token received in step S326 is valid, and then transmits, to the relay server 300, printer information about the image processing device 500 that is the printer to be registered in the first printing service system 100. Specifically, the information management unit 233 transmits a printer name, capability information, or the like of the printer that are managed by the second printing service system 200 to the relay server 300. The printer name is displayed to identify a printer when a user selects the printer. The capability information is information indicating printer capability, and can also be referred to as information for identifying a function of a printer. The capability information may be, for example, information indicating whether duplex printing can be performed or information indicating whether color printing can be performed. In this manner, the information acquisition unit 334 of the relay server 300 acquires the printer information, that is, information about the image processing device 500, from the second printing service system 200. The information acquisition unit 334 of the relay server 300 may store the acquired printer information in the storage unit 310 as necessary.

Next, in step S328, the registration setting unit 335 of the relay server 300 determines a printer name of a virtual printer to be registered in the first printing service system 100. As described above, registration of the printer to be registered in the first printing service system 100 is realized by registering a virtual printer associated with the printer to be registered. That is, in order to use, via the first printing service system 100, the image processing device 500 that is a printer connected to the second printing service system 200, a virtual printer associated with the printer connected to the second printing service system 200 is registered in the first printing service system 100. That is, a physical printer connected to the second printing service system 200 is substantially registered in the first printing service system 100 by registering a virtual printer associated with the physical printer in the first printing service system 100. The registration setting unit 335 determines a printer name of the virtual printer in order to register the virtual printer in the first printing service system 100. In this step, specifically, the registration setting unit 335 determines the printer name of the virtual printer using the user name acquired in step S313 and the printer name acquired in step S327. For example, the registration setting unit 335 determines the printer name of the virtual printer in a manner of including the acquired user name and the acquired printer name. The registration setting unit 335 may use one of the user name acquired in step S313 and the printer name acquired in step S327. In the determination of the printer name of the virtual printer, the registration setting unit 335 may receive an instruction from the user. For example, the registration setting unit 335 may create a plurality of candidates for the printer name, and the user may instruct to select one of the candidates. The user may instruct to add a character string to or delete a character string from the candidates of the printer name created by the registration setting unit 335.

Next, in step S329, processing using an administrator access token stored in advance is executed. When the administrator access token is expired, the credential information updating processing illustrated in FIG. 8 is executed to update the administrator access token. In step S329, the registration setting unit 335 of the relay server 300 requests the first printing service system 100 to register the virtual printer using the administrator access token. Specifically, in step S329, the registration setting unit 335 transmits, to the first printing service system 100, a request for requesting to create and register the virtual printer to be associated with the printer to be registered, together with the administrator access token. At this time, the registration setting unit 335 transmits the virtual printer name determined in step S328 together with the request. That is, the registration setting unit 335 requests to set the virtual printer name together with the registration of the virtual printer.

As can be seen from step S328 and step S329, the registration setting unit 335 sets the virtual printer name that is one of the attribute information managed by the first printing service system 100, using information acquired from the second printing service system 200. The virtual printer name managed by the first printing service system 100 corresponds to a name of the image processing device 500 managed by the first printing service system 100. Therefore, it can be said that the registration setting unit 335 sets the name of the image processing device 500 managed by the first printing service system 100 using the information acquired from the second printing service system 200. In this manner, since the attribute information managed by the first printing service system 100 is automatically set using the information acquired from the second printing service system 200 in the embodiment, the attribute information can be easily set. In particular, in the embodiment, a name of the image processing device 500 managed by the first printing service system 100 is set using a printer name that is a name of the image processing device 500 managed by the second printing service system 200. Accordingly, since a printer name corresponding to a printer name used in the second printing service system 200 is used in the first printing service system 100, a user can easily specify a personal printer registered by the user when using the first printing service system 100. In particular, in the embodiment, the name of the image processing device 500 managed by the first printing service system 100 is set using a name of a general user who performs an operation for registering a printer. Accordingly, a user can easily specify a personal printer registered by the user when using the first printing service system 100.

Next, in step S330, the information management unit 133 of the first printing service system 100 confirms that the administrator access token received in step S329 is valid, and then registers a new virtual printer in the first printing service system 100. At this time, the information management unit 133 sets the virtual printer name received in step S329 as a printer name of the newly registered virtual printer. The information management unit 133 determines a virtual printer ID for the new virtual printer as identification information of the new virtual printer, and notifies the relay server 300 of completion of the registration of the virtual printer together with the virtual printer ID.

Thereafter, in step S331 to step S333, setting processing for the newly registered virtual printer is executed. Specifically, in step S331, the registration setting unit 335 of the relay server 300 transmits a request to set capability information of the newly registered virtual printer to the first printing service system 100 together with the administrator access token. At this time, the registration setting unit 335 transmits the virtual printer ID notified in step S330 and the capability information acquired in step S327 together with the request. In response to this, the information management unit 133 of the first printing service system 100 confirms that the administrator access token received in step S331 is valid, and sets a virtual printer specified by the received virtual printer ID. Specifically, the information management unit 133 sets the received capability information as capability information of the virtual printer specified by the received virtual printer ID. Accordingly, the capability information of the created virtual printer is set. Although a request to set the capability information is transmitted in step S331 in this sequence chart, a request to set a virtual printer name may be transmitted. That is, the virtual printer name determined in step S328 may be set in a step different from a virtual printer registration step. In this case, in step S329, the first printing service system 100 may not be notified of the virtual printer name, or the first printing service system 100 may be notified of a default virtual printer name.

In this manner, in step S331, the registration setting unit 335 also sets the capability information that is one of the attribute information managed by the first printing service system 100, using the capability information that is the information acquired from the second printing service system 200 in the embodiment. Accordingly, since the attribute information managed by the first printing service system 100 is automatically set using the information acquired from the second printing service system 200, the attribute information can be easily set.

In step S332 and step S333, the registration setting unit 335 of the relay server 300 performs setting related to shared use of the newly registered virtual printer. That is, in step S332 and step S333, an access right for the printer is set. Here, since setting for using the printer to be registered as a personal printer is performed, the following specific processing is executed.

In step S332, the registration setting unit 335 first executes processing for creating sharing information. As described above, here, since it is necessary to prevent a user other than the general user who performs an operation for registering a printer from using the printer to be registered, sharing information for not permitting sharing with any one user is created. More specifically, in step S332, the registration setting unit 335 transmits a request to set sharing information of the newly registered virtual printer to the first printing service system 100 together with the administrator access token. At this time, together with the request, the registration setting unit 335 also transmits the virtual printer ID notified in step S330 and an instruction for designating that sharing with any one user is not permitted. At this time, the registration setting unit 335 may transmit a sharing name for identifying the newly created sharing information to the first printing service system 100. For example, the virtual printer name determined in step S328 may be used as such a sharing name. Transmission of the sharing name may be omitted. In response to this, the information management unit 133 of the first printing service system 100 confirms that the administrator access token received in step S332 is valid, and then creates sharing information of the virtual printer specified by the virtual printer ID based on the received information. Specifically, the information management unit 133 creates sharing information indicating that sharing with any one user is not permitted.

In step S333, the registration setting unit 335 executes processing of correcting the sharing information such that, among general users, only a general user who performs an operation for registering a printer can use the printer registered by the general user. In other words, the registration setting unit 335 corrects the sharing information so as to permit only access from the general user who performs an operation for registering a printer among the general users. Specifically, in step S333, the registration setting unit 335 transmits, to the first printing service system 100, a request to correct the sharing information so as to permit the general user who performs an operation for registering a printer to use the virtual printer, together with the administrator access token. At this time, the registration setting unit 335 transmits the user ID acquired in step S313 as identification information of the general user who performs an operation for registering a printer. In response to this, the information management unit 133 of the first printing service system 100 confirms that the administrator access token received in step S333 is valid, and then updates the sharing information based on the received information. Specifically, the information management unit 133 updates the sharing information so as to permit use of a user having the received user ID.

In this manner, in step S332 and step S333, the registration setting unit 335 sets the sharing information corresponding to an access right of the printer to be registered. In other words, the registration setting unit 335 sets information for specifying a user who can access the virtual printer, that is, a user who can access the image processing device 500 corresponding to the virtual printer. Accordingly, since an access right is automatically set, attribute information can be easily set. In particular, in the embodiment, the registration setting unit 335 sets the sharing information, that is, the attribute information of the printer so as to permit only access from a general user who performs an operation for registering a printer among general users. Therefore, it is possible to prevent another user from using the printer. In particular, as will be described later, the first printing service system 100 performs control such that only a printer to which a user has an access right is included in an option when the user designates a printer to be used for printing in the embodiment. Therefore, a user can easily select an available printer when the user instructs printing.

Although the setting of the sharing information is performed in two steps of step S332 and step S333 in the sequence chart illustrated here, processing in the two steps may be executed in one step.

After step S333, in step S334, the registration setting unit 335 of the relay server 300 stores information obtained by the series of processing described above in a database of the storage unit 310 or the like in order to use the information for controlling whether printing by the registered printer is permitted. More specifically, the registration setting unit 335 stores the virtual printer ID, the user ID, the printer mail address, and the access key in the database. At this time, the registration setting unit 335 stores the user ID acquired in step S313 as a user ID of the general user who performs an operation for registering a printer (hereinafter also referred to as a registration user ID) in the database. As described above, the storage unit 310 stores identification information of a user who issued a personal printer registration instruction. When an access key is not set in the printer, storage of the access key is omitted in this step.

In step S335, the web browser 451 inquires the relay server 300 whether the printer registration processing is completed. In response to this, in step S336, the registration setting unit 335 of the relay server 300 transmits a registration completion page that is a page indicating that the registration is completed to the web browser 451. Accordingly, in step S337, the web browser 451 displays the registration completion page on the display unit 420 of the terminal device 400. Although the step of inquiring whether the printer registration processing is completed is performed after step S334 in the sequence chart illustrated here, the inquiring step may be performed periodically before step S334. In this case, the registration setting unit 335 may transmit a page indicating that the registration is not completed to the web browser 451.

The processing flow of registering a personal printer in the first printing service system 100 is described above using the sequence chart. As can be seen from this sequence chart, in the embodiment, when a printer registration instruction is acquired from a general user, the relay server 300 registers a printer in the first printing service system 100, and sets attribute information related to the registered printer using credential information stored in advance. Therefore, according to the embodiment, when a general user registers a printer in the first printing service system 100, both registration and setting can be performed, which improves convenience. In particular, in the setting, a user name of the user who performs a registration operation is used as a virtual printer name, and sharing information is set such that the user can access the sharing information. In this manner, setting according to the user who performs a registration operation is performed. With regard to this aspect, convenience is also improved.

Next, a processing flow of registering a shared printer in the first printing service system 100 will be described. FIGS. 10A to 10D are sequence charts illustrating an example of a flow of shared printer registration processing executed in the printing system 10. A shared printer is a printer that is assumed to be used by a plurality of users. That is, a shared printer is a printer shared by a plurality of users. An order of processing steps in the sequence chart is merely an example, and can be appropriately changed as long as there is no technical contradiction. The flow of the shared printer registration processing will be described below with reference to FIGS. to 10D.

In step S400, an administrator performs a predetermined operation for starting the shared printer registration processing via the input unit 430 of the terminal device 400. Accordingly, for example, a URL of a shared printer registration page is input to the web browser 451 of the terminal device 400. The shared printer registration page is a page prepared to register a shared printer in the first printing service system 100. After step S400, in step S401, the web browser 451 transmits, to the relay server 300, a request to acquire the shared printer registration page according to the input URL. In response to this, in step S402, the registration reception unit 333 of the relay server 300 instructs the web browser 451 to access a predetermined redirect page. In this step, the predetermined redirect page is an authentication page. Therefore, the registration reception unit 333 of the relay server 300 transmits a URL of the authentication page to the web browser 451.

In step S403, the web browser 451 transmits, to the first printing service system 100, a request to acquire the authentication page according to the received URL. In response to this, in step S404, the authentication control unit 131 of the first printing service system 100 transmits the authentication page to the web browser 451. Accordingly, in step S405, the web browser 451 displays the authentication page on the display unit 420 of the terminal device 400.

In step S406, the administrator inputs authentication information to the authentication page via the input unit 430. Specifically, for example, the administrator inputs a user ID of the administrator, a password, or the like. Here, required authentication information is authentication information used in the first printing service system 100, and specifically, the required authentication information is a user ID, a password, and the like that are registered in advance. In step S407, the web browser 451 transmits the input authentication information to the first printing service system 100. The authentication control unit 131 of the first printing service system 100 executes authentication processing based on the authentication information received from the web browser 451. That is, the authentication control unit 131 determines whether the received authentication information matches administrator authentication information registered in advance.

When the authentication is successful in the authentication processing, that is, when the received authentication information matches the administrator authentication information registered in advance, in step S408, the authentication control unit 131 of the first printing service system 100 issues an authentication code and further instructs the web browser 451 to access a predetermined redirect destination. The predetermined redirect destination is the relay server 300. The authentication code is passed to the relay server 300 by such redirecting. Therefore, the authentication control unit 131 of the first printing service system 100 transmits a URL indicating the predetermined redirect destination together with the authentication code to the web browser 451.

In step S409, the web browser 451 accesses the predetermined redirect destination together with the authentication code. Accordingly, the relay server 300 acquires the authentication code. In step S410, the authentication control unit 331 of the relay server 300 transmits a request for requesting generation of an administrator token to the first printing service system 100 together with the received authentication code. In step S411, the authentication control unit 131 of the first printing service system 100 confirms that the authentication code received in step S410 matches the authentication code transmitted in step S408, and then issues an administrator access token, and transmits the administrator access token to the relay server 300. Thereafter, in step S412, the registration reception unit 333 transmits the shared printer registration page to the web browser 451. Accordingly, in step S413, the web browser 451 displays the shared printer registration page on the display unit 420 of the terminal device 400.

In step S414, the administrator performs a predetermined operation of requesting registration of a shared printer while designating a printer to be registered via the input unit 430 of the terminal device 400. In the embodiment, the printer to be registered is not a printer connected to the first printing service system 100, and is a printer connected to the second printing service system 200, that is, the image processing device 500. The printer is registered in the first printing service system 100 by being associated with a virtual printer registered in the first printing service system 100. In step S414, more specifically, the administrator inputs identification information for identifying the printer to be registered and information for designating a sharer to the shared printer registration page displayed in step S413. For example, the administrator inputs the information for designating a sharer and identification information of a printer installed at a place where the designated sharer can use the printer. The information for designating a sharer may be information for designating a user belonging to a specific group as a sharer. In this case, the information for designating a sharer may be identification information for specifying a group, such as a group ID. Instead of the identification information for specifying a group, a user ID of an individual user among a plurality of users designated as sharers may be input. The information for designating a sharer may be information for designating any user, that is, all users, as a sharer. In the embodiment, for example, the administrator inputs a mail address of the printer to be registered as printer identification information. That is, the mail address of the printer to be registered is input to the web browser 451 of the terminal device 400. Other pieces of information that can uniquely identify the printer to be registered may be used instead of the mail address.

Next, in step S415, the web browser 451 transmits, to the relay server 300, a request for requesting registration of the printer in the first printing service system 100 together with the information for designating a sharer and the mail address of the printer to be registered. Accordingly, the registration reception unit 333 acquires a registration instruction of the image processing device 500 from the administrator. In response to this, in step S416, the authentication control unit 331 of the relay server 300 transmits the mail address of the printer to be registered to the second printing service system 200 and requests authentication. When there is a printer corresponding to the mail address and an access key such as a password is set in advance for the printer, processing from step S417 to step S422 to be described later is executed, and it is determined that the authentication is successful only when the access key is input. On the other hand, when there is a printer corresponding to the mail address and an access key is not set for the printer, it is determined that the authentication is successful without executing the processing from step S417 to step S422 to be described later. Hereinafter, a case where an access key is set for the printer identified by the mail address will be described.

In step S417, the authentication control unit 231 of the second printing service system 200 requests the relay server 300 to transmit the access key. In response to this, in step S418, the authentication control unit 331 of the relay server 300 transmits, to the web browser 451, an input page for accepting an input of the access key. Accordingly, in step S419, the web browser 451 displays the input page of the access key on the display unit 420 of the terminal device 400. Next, in step S420, the administrator inputs an access key to the input page via the input unit 430. In step S421, the web browser 451 transmits the input access key to the relay server 300. In step S422, the authentication control unit 331 of the relay server 300 transmits the mail address and the access key of the printer to be registered to the second printing service system 200, and requests authentication again. In response to this, the authentication control unit 231 of the second printing service system 200 performs authentication based on information transmitted from the relay server 300.

When the authentication is successful, in step S423, the authentication control unit 231 of the second printing service system 200 issues a token and transmits the token to the relay server 300. The token is an access token for accessing predetermined information managed by the second printing service system 200. In step S424, the information acquisition unit 334 of the relay server 300 that acquired the token transmitted from the second printing service system 200 transmits, to the second printing service system 200, a request to acquire printer information about the printer to be registered, together with the token acquired in step S423.

In response to this, in step S425, the information management unit 233 of the second printing service system 200 confirms that the token received in step S424 is valid, and then transmits, to the relay server 300, the printer information about the image processing device 500 that is the printer to be registered in the first printing service system 100. Specifically, the information management unit 233 transmits a printer name, capability information, or the like of the printer that are managed by the second printing service system 200 to the relay server 300. In this manner, the relay server 300 acquires the printer information. The information acquisition unit 334 of the relay server 300 may store the acquired printer information in the storage unit 310 as necessary.

Next, in step S426, the registration setting unit 335 of the relay server 300 determines a printer name of a virtual printer to be registered in the first printing service system 100. That is, in step S426, in order to register a virtual printer associated with a physical shared printer in the first printing service system 100, the registration setting unit 335 determines a printer name of the virtual printer. In this step, specifically, the registration setting unit 335 determines the printer name of the virtual printer using the printer name acquired in step S425. For example, the registration setting unit 335 determines the printer name of the virtual printer in a manner of including the acquired printer name.

Next, in step S427, the registration setting unit 335 of the relay server 300 requests the first printing service system 100 to register the virtual printer using the administrator access token acquired in step S411. Specifically, in step S427, the registration setting unit 335 transmits, to the first printing service system 100, a request for requesting to create and register a virtual printer to be associated with the printer to be registered, together with the administrator access token. At this time, the registration setting unit 335 transmits the virtual printer name determined in step S426 together with the request. That is, the registration setting unit 335 requests to set the virtual printer name together with the registration of the virtual printer.

In response to this, in step S428, the information management unit 133 of the first printing service system 100 confirms that the administrator access token received in step S427 is valid, and then registers a new virtual printer in the first printing service system 100. At this time, the information management unit 133 sets the virtual printer name received in step S427 as a printer name of the newly registered virtual printer. The information management unit 133 determines a virtual printer ID for the new virtual printer as identification information of the new virtual printer, and notifies the relay server 300 of completion of the registration of the virtual printer together with the virtual printer ID.

Thereafter, in step S429 to step S432, setting processing for the newly registered virtual printer is executed. Specifically, in step S429, the registration setting unit 335 of the relay server 300 transmits a request to set capability information of the newly registered virtual printer to the first printing service system 100 together with the administrator access token. At this time, the registration setting unit 335 transmits the virtual printer ID notified in step S428 and the capability information acquired in step S425 together with the request. In response to this, the information management unit 133 of the first printing service system 100 confirms that the administrator access token received in step S429 is valid, and sets a virtual printer specified by the received virtual printer ID. Specifically, the information management unit 133 sets the received capability information as capability information of the virtual printer specified by the received virtual printer ID. Accordingly, the capability information of the created virtual printer is set. Although a request to set the capability information is transmitted in step S429 in this sequence chart, a request to set the virtual printer name may be transmitted. That is, the virtual printer name determined in step S426 may be set in a step different from a virtual printer registration step. In this case, in step S427, the first printing service system 100 may not be notified of the virtual printer name, or the first printing service system 100 may be notified of a default virtual printer name.

In step S430, step S431, and step S432, the registration setting unit 335 of the relay server 300 performs setting related to shared use of the newly registered virtual printer. That is, in step S430, step S431, and step S432, an access right for the printer is set. Here, since setting for using the printer to be registered as a shared printer is performed, the following specific processing is executed. When the shared printer is shared with any one user, that is, when the relay server 300 receives information for designating any one user as a sharer in step S415, the registration setting unit 335 executes processing in step S430 to be described below. When the shared printer is shared by a user belonging to a specific group, that is, when the relay server 300 receives information for designating a user belonging to a specific group as a sharer in step S415, the registration setting unit 335 executes processing in step S431 and step S432 to be described below.

When the relay server 300 receives information for designating any one user as a sharer, the registration setting unit 335 executes processing for creating sharing information in step S430. As described above, since it is required that any one user can use the printer to be registered here, sharing information that permits sharing with any one user is created. More specifically, in step S430, the registration setting unit 335 transmits a request to set sharing information of the newly registered virtual printer to the first printing service system 100 together with the administrator access token. At this time, together with the request, the registration setting unit 335 transmits the virtual printer ID notified in step S428 and an instruction for designating that sharing with any one user is permitted. At this time, the registration setting unit 335 may transmit a sharing name for identifying the newly created sharing information to the first printing service system 100. For example, the virtual printer name determined in step S426 may be used as such a sharing name. Transmission of the sharing name may be omitted. In response to this, the information management unit 133 of the first printing service system 100 confirms that the administrator access token received in step S430 is valid, and then creates sharing information of the virtual printer specified by the virtual printer ID based on the received information. Specifically, the information management unit 133 creates sharing information indicating that sharing with any one user is permitted.

In this manner, in step S430, the registration setting unit 335 sets sharing information corresponding to an access right of the printer to be registered. In other words, the registration setting unit 335 sets information for specifying a user who can access the virtual printer, that is, a user who can access the image processing device 500 corresponding to the virtual printer. Accordingly, since an access right is automatically set, attribute information can be easily set.

When the relay server 300 receives information for designating a user belonging to a specific group as a sharer, the registration setting unit 335 first executes processing for creating sharing information in step S431. Since it is required to prevent a user other than the user belonging to a specific group from using the printer to be registered, sharing information for not permitting sharing with any one user is created. More specifically, in step S431, the registration setting unit 335 transmits a request to set sharing information of the newly registered virtual printer to the first printing service system 100 together with the administrator access token. At this time, together with the request, the registration setting unit 335 also transmits the virtual printer ID notified in step S428 and an instruction for designating that sharing with any one user is not permitted. At this time, the registration setting unit 335 may transmit a sharing name for identifying the newly created sharing information to the first printing service system 100. For example, the virtual printer name determined in step S426 may be used as such a sharing name. Transmission of the sharing name may be omitted. In response to this, the information management unit 133 of the first printing service system 100 confirms that the administrator access token received in step S431 is valid, and then creates sharing information of the virtual printer specified by the virtual printer ID based on the received information. Specifically, the information management unit 133 creates sharing information indicating that sharing with any one user is not permitted.

In step S432, the registration setting unit 335 executes processing of correcting the sharing information such that only a user belonging to a specific group can use the printer to be registered. Specifically, in step S432, the registration setting unit 335 transmits, to the first printing service system 100, a request to correct the sharing information so as to permit a user belonging to a specific group to use the virtual printer, together with the administrator access token. At this time, the registration setting unit 335 transmits, for example, a group ID acquired in step S415 as information for specifying a user for whom sharing is permitted. In response to this, the information management unit 133 of the first printing service system 100 confirms that the administrator access token received in step S432 is valid, and then updates the sharing information based on the received information. Specifically, the information management unit 133 updates the sharing information such that a user specified by the received group ID is permitted to use the virtual printer.

In this manner, in step S431 and step S432, the registration setting unit 335 sets sharing information corresponding to an access right of the printer to be registered. In other words, the registration setting unit 335 sets information for specifying a user who can access the virtual printer, that is, a user who can access the image processing device 500 corresponding to the virtual printer.

Accordingly, since an access right is automatically set, attribute information can be easily set.

Although the setting of the sharing information is performed in two steps of step S431 and step S432 in the sequence chart illustrated in FIG. 10C, processing in the two steps may be executed in one step.

After step S430 or step S432, in step S433, the registration setting unit 335 of the relay server 300 stores information obtained by the series of processing described above in a database of the storage unit 310 or the like in order to use the information for controlling whether printing by the registered printer is permitted. More specifically, the registration setting unit 335 stores the virtual printer ID, the printer mail address, and the access key in the database. When an access key is not set in the printer, storage of the access key is omitted in this step. In the sequence chart, since a shared printer is registered by an operation of an administrator instead of registering a personal printer by an operation of a general user, the registration setting unit 335 does not store a user ID of a specific user as a registration user ID. Instead, the registration setting unit 335 stores a specific value (for example, a NULL value) that is not a user ID of a specific user in the database as a registration user ID.

In step S434, the web browser 451 inquires the relay server 300 whether the printer registration processing is completed. In response to this, in step S435, the registration setting unit 335 of the relay server 300 transmits a registration completion page that is a page indicating that the registration is completed to the web browser 451. Accordingly, in step S436, the web browser 451 displays the registration completion page on the display unit 420 of the terminal device 400. Although the step of inquiring whether the printer registration processing is completed is performed after step S433 in the sequence chart illustrated here, the inquiring step may be performed periodically before step S433. In this case, the registration setting unit 335 may transmit a page indicating that the registration is not completed to the web browser 451.

Next, a flow of printing processing when printing performed by the image processing device 500 that is a printer connected to the second printing service system 200 is performed via the first printing service system 100 will be described. FIGS. 11A to 11C and FIG. 12 are sequence charts illustrating an example of a flow of printing processing executed in the printing system 10. In particular, these sequence charts show a flow of printing processing when a user designates printing performed by a printer that is connected to the second printing service system 200 and is already registered in the first printing service system 100 by the registration processing illustrated in FIGS. 9A to 9C or FIGS. 10A to 10D. An order of processing steps in the sequence chart is merely an example, and can be appropriately changed as long as there is no technical contradiction. The flow of the printing processing will be described below with reference to FIGS. 11A to 11C and FIG. 12.

In step S500, a general user performs, via the input unit 430 of the terminal device 400, a predetermined operation for printing data to be printed. Hereinafter, data to be printed is referred to as printing data. Specifically, for example, a general user performs an operation of designating a printer to be used for printing, printing data, and printing setting. Here, as described above, the image processing device 500 that is a printer connected to the second printing service system 200 is designated as the printer to be used for printing. More specifically, a virtual printer corresponding to the image processing device 500 is designated. In the embodiment, the printing control unit 132 of the first printing service system 100 performs control such that only a printer to which a user has an access right is included in an option of the printer to be used for printing. More specifically, the printing control unit 132 constitutes a user interface screen so that only the printer to which a user has an access right is displayed as an option of the printer to be used for printing.

The printing setting designated in step S500 is a setting value set in the printer for printing. For example, the printing setting includes, but is not limited to, a setting value for designating a size of a sheet to be used, a setting value for designating whether to perform color printing, and a setting value for designating whether to perform duplex printing.

When the operation in step S500 is performed, in step S501, the printing request unit 452 of the terminal device 400 requests the first printing service system 100 to perform printing. At this time, the printing request unit 452 transmits a user ID of a user who instructed the printing in step S500, a virtual printer ID of the designated printer, the designated printing setting, and the designated printing data to the first printing service system 100. Then, the first printing service system 100 acquires these pieces of information.

Next, in step S502, the printing control unit 132 of the first printing service system 100 creates a printing job based on the information received in step S501, and notifies the relay server 300 of the presence of the printing job. Specifically, the printing control unit 132 notifies the relay server 300 of a job ID that is identification information of the printing job, and the virtual printer ID of the designated printer. In step S503, the printing control unit 132 notifies the terminal device 400 of the job ID.

When the relay server 300 receives the notification transmitted in step S502, in step S504, the printing control unit 332 of the relay server 300 transmits a request to acquire job information to the first printing service system 100. Specifically, the printing control unit 332 transmits the request together with the virtual printer ID and the job ID notified in step S504. In response to this, in step S505, the printing control unit 132 of the first printing service system 100 transmits the user ID and the printing setting received in step S501 and a URL indicating a storage location of the printing data received in step S501 to the relay server 300 as job information. In the following description, the URL indicating a storage location of the printing data is referred to as a printing data URL.

When the relay server 300 receives the job information, in step S506, the printing control unit 332 of the relay server 300 executes processing of reading a database of the storage unit 310 or the like in order to acquire information stored in association with the received virtual printer ID. Accordingly, in step S507, the printing control unit 332 reads a registration user ID, a printer mail address, and an access key that are stored in association with the virtual printer ID. These pieces of information are the information stored in step S334 or step S433 described above.

After step S507, the printing control unit 332 of the relay server 300 executes determination processing for preventing a personal printer from being used by an inappropriate user. Specifically, the printing control unit 332 determines whether a user other than a general user who performs an operation for registering a personal printer performs an operation for printing using the personal printer. As long as use of the personal printer is not requested by an inappropriate user, that is, as long as a user other than the general user who performs an operation for registering a personal printer does not perform an operation for printing using the personal printer, the processing from step S508 to step S520 is executed. On the other hand, when the use of the personal printer is requested by an inappropriate user, that is, when a user other than the general user who performs an operation for registering a personal printer performs an operation for printing using the personal printer, printing is not performed, and in step S521 to be described later, the printing control unit 332 outputs an error to the first printing service system 100.

The printing control unit 332 more specially executes the following determination processing as the determination processing for preventing the personal printer from being used by an inappropriate user. In a case where the designated printer is registered in the first printing service system 100 as a personal printer, the printing control unit 332 determines that use of the personal printer is not requested by an inappropriate user when a user who registered the designated printer in the first printing service system 100 matches a user who instructed printing. Specifically, for example, in a case where a value of the registration user ID read in step S507 is not NULL value, the printing control unit 332 determines that the personal printer is not used by an inappropriate user when the user ID received in step S505 matches the registration user ID read in step S507. In this case, the printing control unit 332 transmits a printing request to the second printing service system 200 in step S508 to be described later.

On the other hand, in a case where the designated printer is registered in the first printing service system 100 as a personal printer, the printing control unit 332 determines that use of the personal printer is requested by an inappropriate user when a user who registered the printer in the first printing service system 100 is different from a user who instructed printing. Specifically, for example, in a case where a value of the registration user ID read in step S507 is not NULL value, the printing control unit 332 determines that the personal printer is used by an inappropriate user when the user ID received in step S505 does not match the registration user ID read in step S507. At this time, printing is not performed and an error is output. In this case, the printing control unit 332 does not transmit a printing request to the second printing service system 200.

In this manner, in a case where a personal printer is designated as a printer used in printing according to a printing job, the printing control unit 332 transmits a printing request for requesting printing by the personal printer only when the printing job is a printing job corresponding to a printing instruction from a user who registered the personal printer. In this case, more specifically, the printing control unit 332 determines whether to transmit the printing request by comparing the registration user ID that is identification information stored for a registration user with a user ID that is identification information of a user who issues a printing instruction corresponding to a printing job. According to such a configuration, it is possible to prevent a user other than a certain user from using a personal printer registered by the certain user. Note that even when an access right is set to restrict a general user who can access the personal printer to only a user who registered the personal printer, a user who has a higher right than the user who registered the personal printer, such as an administrator, may be able to use the personal printer. The access right of the personal printer that is attribute information managed by the first printing service system 100 is information that can be freely set by an administrator. Accordingly, an administrator may erroneously set to give an access right of the personal printer to another user. That is, in these cases, the personal printer may be used by another user. On the other hand, as described above, the relay server 300 collates the registration user with the user who instructed printing and determines whether the personal printer can be used in the embodiment. Therefore, in the cases described above, it is possible to appropriately prevent the personal printer from being used by another user.

In a case where the designated printer is registered in the first printing service system 100 as a shared printer, the printing control unit 332 determines that use of the personal printer is not requested by an inappropriate user regardless of the user who instructed printing. Specifically, for example, when the value of the registration user ID read in step S507 is NULL value, the printing control unit 332 determines that the personal printer is not used by an inappropriate user regardless of the user who instructed printing. In this case, the printing control unit 332 transmits a printing request to the second printing service system 200 in step S508 to be described later.

In this manner, when a shared printer is designated as a printer used in printing according to a printing job, the printing control unit 332 transmits a printing request for requesting printing by the shared printer to the second printing service system 200 regardless of the printing job is a printing job corresponding to a printing instruction of which user. Therefore, a user who does not register a personal printer can also use the printing service by using the system.

In step S508, the printing control unit 332 of the relay server 300 requests the second printing service system 200 to perform printing. At this time, the printing control unit 332 transmits the printer mail address and the access key read in step S507 and the printing setting and the printing data URL acquired in step S505 to the second printing service system 200. In this manner, the printing control unit 332 has a function of transmitting a printing request to the second printing service system 200 in response to a printing job from the first printing service system 100.

When the second printing service system 200 receives the printing request from the relay server 300, in step S509, the printing control unit 232 of the second printing service system 200 accesses the printing data URL notified in step S508 in order to acquire the printing data. Accordingly, in step S510, the printing control unit 232 of the second printing service system 200 acquires the printing data from the first printing service system 100.

After step S510, in step S511, the printing control unit 232 converts the printing data acquired in step S510 into printing data conforming to a predetermined printer language. Thereafter, in step S512, the printing control unit 232 notifies the image processing device 500 that is a printer to be used for printing of the presence of a printing job for printing the converted printing data. The printing job is a printing job corresponding to a printing job managed by the first printing service system 100, and is a printing job managed by the printing control unit 232 of the second printing service system 200. Therefore, an ID is newly assigned in addition to a value of the job ID described above. Hereinafter, an ID of the printing job managed by the printing control unit 232 of the second printing service system 200 is referred to as a job ID 2. In step S513, the printing control unit 232 of the second printing service system 200 notifies the relay server 300 of the job ID 2. In response to this, in step S514, the printing control unit 332 of the relay server 300 executes processing of storing a correspondence relationship between the printing job of the first printing service system 100 and the printing job of the second printing service system 200. More specifically, the printing control unit 332 stores a virtual printer ID, a job ID of the first printing service system 100, a printer ID of the printer to be used for printing, and a job ID of the second printing service system 200, that is, the job ID 2, in a database of the storage unit 310 or the like in association with one another.

When the image processing device 500 receives the notification transmitted in step S512, in step S515, the printing processing unit 541 of the image processing device 500 transmits a request to acquire the printing data to the second printing service system 200. In response to this, in step S516, the printing control unit 232 of the second printing service system 200 transmits the converted printing data to the image processing device 500.

After step S516, the notification processing illustrated in the sequence chart in FIG. 12 is executed each time a job state changes. Thereafter, processing of step S517 is executed. Here, a flow of the processing executed each time a job state changes will be described with reference to FIG. 12. For example, the processing illustrated in FIG. 12 is executed when printing processing is started in the image processing device 500 or when an error occurs after the printing processing is started. An order of processing steps in the sequence chart is merely an example, and can be appropriately changed as long as there is no technical contradiction.

In step S600, the printing processing unit 541 of the image processing device 500 notifies the second printing service system 200 of a job state. When the second printing service system 200 receives this notification, in step S601, the printing control unit 232 of the second printing service system 200 notifies the relay server 300 of the job state notified in step S600 together with the printer ID and the job ID 2. Accordingly, the printing control unit 332 of the relay server 300 acquires the job state of the printing processing executed by the image processing device 500.

When the relay server 300 receives the notification of the job state, in step S602, the printing control unit 332 of the relay server 300 executes processing of reading a database of the storage unit 310 or the like to acquire information stored in association with the received printer ID and job ID 2. Accordingly, in step S603, the printing control unit 332 reads a virtual printer ID and a job ID that are stored in association with the received printer ID and job ID 2. In step S604, the printing control unit 332 of the relay server 300 notifies the first printing service system 100 of the job state notified in step S601 together with the virtual printer ID and the job ID. That is, when the printing control unit 332 acquires the job state from the second printing service system 200, the printing control unit 332 transmits the job state to the first printing service system 100.

In the embodiment, the first printing service system 100 manages not only a job state but also a printer state. On the other hand, the second printing service system 200 manages a job state but does not manage a printer state. Here, the job state refers to a processing state for each printing job, in other words, a processing state for each piece of printing processing, and the printer state refers to a state of a printer that affects all printing jobs processed by a single printer, in other words, affects all pieces of printing processing processed by a single printer.

In the embodiment, in order to notify the first printing service system 100 of a printer state, in step S605, the printing control unit 332 of the relay server 300 executes processing of determining a printer state using the job state notified from the second printing service system 200. That is, the printing control unit 332 determines a state of the image processing device 500 based on the job state acquired from the second printing service system 200. Accordingly, in step S606, a printer state of a virtual printer is determined. Specifically, when the job state notified from the second printing service system 200 indicates an error that does not depend on a printing job, the printing control unit 332 also uses the job state as a printer state. For example, when the job state notified from the second printing service system 200 indicates a printing error due to shortage of a printing medium, the printing control unit 332 determines that a printer state of the image processing device 500 and a virtual printer associated with the image processing device 500 is a state in which a printer is short of a printing medium (a printing medium shortage state). The printing medium is, for example, paper, and may be a medium made of a material other than paper. For example, when the job state notified from the second printing service system 200 indicates a printing error due to shortage of a color material, the printing control unit 332 determines that a printer state of the image processing device 500 and a virtual printer associated with the image processing device 500 is a state in which a printer is short of a color material (a color material shortage state). The color material is, for example, ink, and may be toner or the like. When the job state notified from the second printing service system 200 is a state in which printing is normally performed, the printing control unit 332 may use the job state as a printer state. That is, the printing control unit 332 may determine that the printer state is a printing state.

In step S607, the printing control unit 332 of the relay server 300 notifies the first printing service system 100 of the printer state of the virtual printer determined in step S606 together with the virtual printer ID. That is, the printing control unit 332 transmits a state of the image processing device 500 to the first printing service system 100. Accordingly, when the job state notified from the second printing service system 200 in step S601 indicates a printing error due to, for example, paper shortage or ink shortage, the first printing service system 100 is notified of the printing error due to paper shortage or ink shortage as a job state and is notified of a paper shortage state or an ink shortage state as a printer state.

On the other hand, when the job state notified from the second printing service system 200 indicates an error specific to a printing job, the printing control unit 332 does not reflect the job state in a printer state. For example, when the job state notified from the second printing service system 200 indicates a printing error due to a communication error, the printing control unit 332 does not reflect the job state in a printer state of the image processing device 500 and the virtual printer associated with the image processing device 500. For example, when the job state notified from the second printing service system 200 indicates cancellation of a printing job based on an instruction or the like from a user, the printing control unit 332 does not reflect the job state in a printer state of the image processing device 500 and the virtual printer associated with the image processing device 500. Accordingly, when the job state notified from the second printing service system 200 in step S601 indicates, for example, a communication error or cancellation of a printing job, the first printing service system 100 is notified of the communication error or the cancellation of the printing job as a job state, and the first printing service system 100 is not notified of a printer state.

In step S608, the state output unit 453 of the terminal device 400 transmits, to the first printing service system 100, a request for acquiring job information by designating a virtual printer ID and a job ID. In response to this, in step S609, the printing control unit 132 of the first printing service system 100 transmits the job state received in step S604 to the terminal device 400. Accordingly, in step S610, the state output unit 453 of the terminal device 400 displays the job state on the display unit 420 of the terminal device 400.

In step S611, the state output unit 453 of the terminal device 400 transmits, to the first printing service system 100, a request to acquire a printer state by designating a virtual printer ID. In response to this, in step S612, the printing control unit 132 of the first printing service system 100 transmits the printer state received in step S607 to the terminal device 400. Accordingly, in step S613, the state output unit 453 of the terminal device 400 displays the printer state on the display unit 420 of the terminal device 400.

As can be seen from this sequence chart, each time a job state is updated, the printing control unit 332 of the relay server 300 transmits the updated job state to the first printing service system 100. Therefore, a user can appropriately know a current job state via the first printing service system 100.

Returning to FIG. 11B, processing in step S517 and subsequent steps will be described. In step S517, when the printing processing is completed, the printing processing unit 541 of the image processing device 500 notifies the second printing service system 200 of the completion of the printing by notifying a processing result of the printing job. Specifically, the printing processing unit 541 performs notification on whether the printing processing is normally completed. That is, the printing processing unit 541 performs notification on whether the printing is successful or failed. When the second printing service system 200 receives this notification, in step S518, the printing control unit 232 of the second printing service system 200 notifies the relay server 300 of the processing result notified in step S517 as a job state together with the printer ID and the job ID 2. Accordingly, the printing control unit 332 of the relay server 300 acquires the job state of the printing processing executed by the image processing device 500.

When the relay server 300 receives the notification of the job state, in step S519, the printing control unit 332 of the relay server 300 executes processing of reading a database of the storage unit 310 or the like in order to acquire information stored in association with the received printer ID and job ID 2. Accordingly, in step S520, the printing control unit 332 reads the virtual printer ID and the job ID that are stored in association with the received printer ID and job ID 2.

Next, in step S521, the printing control unit 332 of the relay server 300 notifies the first printing service system 100 of the job state together with the virtual printer ID and the job ID. That is, when the printing control unit 332 acquires the job state from the second printing service system 200, the printing control unit 332 transmits the job state to the first printing service system 100. As described above, when it is determined that use of a personal printer is requested by an inappropriate user, the processing up to step S520 is skipped, and in step S521, the first printing service system 100 is notified of a job state indicating a printing failure due to use of a personal printer by an inappropriate user. More specifically, in this case, the first printing service system 100 is notified of occurrence of an error due to use of a personal printer by an inappropriate user.

In step S522, the state output unit 453 of the terminal device 400 transmits, to the first printing service system 100, a request to acquire job information by designating a virtual printer ID and a job ID. In response to this, in step S523, the printing control unit 132 of the first printing service system 100 transmits the job state received in step S521 to the terminal device 400. Accordingly, in step S524, the state output unit 453 of the terminal device 400 displays the job state on the display unit 420 of the terminal device 400.

When the relay server 300 receives the notification of the processing result of the printing job, in step S525, the printing control unit 332 of the relay server 300 determines that a state of the image processing device 500 and the virtual printer is an idle state (a standby state), and notifies the first printing service system 100 of the printer state. More specifically, the printing control unit 332 determines that the printer state of the virtual printer and the image processing device 500 associated with the virtual printer is an idle state when the printing processing is normally completed for all printing jobs of the same virtual printer, that is, the same image processing device 500. In this manner, the printing control unit 332 determines a state of the image processing device 500 based on the job state acquired from the second printing service system 200. In step S525, specifically, the printing control unit 332 notifies the first printing service system 100 that the printer state of the virtual printer is the idle state together with the virtual printer ID. In this manner, the printing control unit 332 transmits the state of the image processing device 500 to the first printing service system 100.

Thereafter, in step S526, the state output unit 453 of the terminal device 400 transmits, to the first printing service system 100, a request to acquire the printer state by designating a virtual printer ID. In response to this, in step S527, the printing control unit 132 of the first printing service system 100 transmits information indicating that the printer state is the idle state to the terminal device 400. Accordingly, in step S528, the state output unit 453 of the terminal device 400 displays the information indicating that the printer state is the idle state on the display unit 420 of the terminal device 400.

The flow of the printing processing when printing performed by a printer connected to the second printing service system 200 is performed via the first printing service system 100 is described above using the sequence charts. As can be seen from these sequence charts, the printing control unit 332 of the relay server 300 relays printing job information for printing of the printing data between the first printing service system 100 and the second printing service system 200. The image processing device 500 prints the printing data based on the printing job information relayed by the relay server 300. Therefore, in a system in which the first printing service system 100 and the second printing service system 200 cooperate with each other, the image processing device 500 can perform printing.

As can be seen from these sequence charts, in the embodiment, the printing control unit 332 of the relay server 300 acquires a job state of printing processing executed by the image processing device 500 from the second printing service system 200, and transmits the job state to the first printing service system 100. Therefore, the first printing service system 100 can provide information about the job state to a user. As described above, the job state transmitted to the first printing service system 100 may be a job state indicating a state in which a printing error occurs after the execution of the printing processing, or may be a job state indicating a state in which the printing processing is normally completed. The printing control unit 332 of the relay server 300 determines a state of the image processing device 500 based on the job state acquired from the second printing service system 200, and transmits the state of the image processing device 500 to the first printing service system 100. Therefore, the first printing service system 100 can provide information about the state of the image processing device 500 to a user. The first printing service system 100 is connected to the terminal device 400 that acquires and outputs the job state and the state of the image processing device 500 via the first printing service system 100. Therefore, a user can easily know the job state and the state of the image processing device 500 using the terminal device 400.

The present disclosure is not limited to the embodiment described above, and can be appropriately modified without departing from the scope of the present disclosure. For example, the relay server 300 may be included in the second printing service system 200. According to this configuration, for example, a same vendor can easily manage the relay server 300 and the second printing service system 200. Although the second printing service system 200 acquires the printing data from the first printing service system 100 in the embodiment described above, the relay server 300 may acquire the printing data from the first printing service system 100, and the relay server 300 may transmit the printing data to the second printing service system 200. Although an example in which a general user registers a personal printer is described in the embodiment described above, for a general user, an administrator may register a personal printer of the general user.

In the example described above, a program includes an instruction group (or a software code) for causing a computer to execute one or more functions described in the embodiment when the program is read by the computer. The program may be stored in a non-transitory computer-readable medium or a physical storage medium. Examples of the computer-readable medium or the physical storage medium include, but not limited to, a random-access memory (RAM), a read-only memory (ROM), a flash memory, a solid-state drive (SSD), other memory technologies, a CD-ROM, a digital versatile disk (DVD), a Blu-ray (registered trademark) disk, other optical disk storages, a magnetic cassette, a magnetic tape, and a magnetic disk storage, or other magnetic storage devices. The program may be transmitted on a temporary computer-readable medium or a communication medium. Examples of the temporary computer-readable medium or the communication medium include, but not limited to, a propagation signal in an electrical format, an optical format, an acoustic format, or other formats.

A part or all of the embodiment described above may be described as the following appendixes, but are not limited thereto.

Appendix 1

A server connected to a first printing service system and a second printing service system, the second printing service system being connected to a first image processing device and a second image processing device, the server including:
   a registration reception unit configured to acquire a registration instruction of the first image processing device from a first user having a first right or a registration instruction of the second image processing device from a second user having a second right that is a right more restricted than the first right;
   a registration unit configured to register the first image processing device in the first printing service system when the registration instruction of the first image processing device is acquired, and register the second image processing device in the first printing service system when the registration instruction of the second image processing device is acquired; and
   a printing control unit configured to transmit a printing request to the second printing service system according to a printing job from the first printing service system, in which
   in a case where the second image processing device is designated as an image processing device used in printing according to the printing job, the printing control unit transmits the printing request for requesting printing by the second image processing device to the second printing service system only when the printing job is a printing job corresponding to a printing instruction of the second user, and in a case where the first image processing device is designated as an image processing device used in printing according to the printing job, the printing control unit transmits the printing request for requesting printing by the first image processing device to the second printing service system regardless of the printing job is a printing job corresponding to a printing instruction of which user.

Appendix 2

The server according to the Appendix 1, further including:
a storage unit configured to store identification information of the second user that is a user who issued the registration instruction of the second image processing device, in which
the printing control unit determines whether to transmit the printing request for requesting printing by the second image processing device to the second printing service system by comparing the stored identification information of the second user with identification information of a user who issued a printing instruction corresponding to the printing job.

Appendix 3

The server according to Appendix 1 or 2, further including:
a setting unit configured to set information for specifying a user who is accessible to the first image processing device or the second image processing device, that is, set information managed by the first printing service system, when the first image processing device or the second image processing device is registered, in which
when the setting is performed for the second image processing device, the setting unit performs setting such that only access from the second user among users having the second right is permitted.

Appendix 4

The server according to any one of Appendixes 1 to 3, in which
the registration unit registers the first image processing device and the second image processing device in the first printing service system as virtual devices.

Appendix 5

The server according to any one of Appendixes 1 to 4, in which
the server is included in the second printing service system.

Appendix 6

A printing system including:
a first printing service system;
a first image processing device;
a second image processing device;
a second printing service system connected to the first image processing device and the second image processing device; and
a server connected to the first printing service system and the second printing service system, in which the server includes
a registration reception unit configured to acquire a registration instruction of the first image processing device from a first user having a first right or a registration instruction of the second image processing device from a second user having a second right that is a right more restricted than the first right,
a registration unit configured to register the first image processing device in the first printing service system when the registration instruction of the first image processing device is acquired, and register the second image processing device in the first printing service system when the registration instruction of the second image processing device is acquired, and
a printing control unit configured to transmit a printing request to the second printing service system according to a printing job from the first printing service system,
in a case where the second image processing device is designated as an image processing device used in printing according to the printing job, the printing control unit transmits the printing request for requesting printing by the second image processing device to the second printing service system only when the printing job is a printing job corresponding to a printing instruction of the second user,
in a case where the first image processing device is designated as an image processing device used in printing according to the printing job, the printing control unit transmits the printing request for requesting printing by the first image processing device to the second printing service system regardless of the printing job is a printing job corresponding to a printing instruction of which user, and
the first image processing device or the second image processing device executes printing processing based on the printing request.

Appendix 7

An information processing method for a server connected to a first printing service system and a second printing service system, the second printing service system being connected to a first image processing device and a second image processing device, the information processing method including:
acquiring a registration instruction of the first image processing device from a first user having a first right or a registration instruction of the second image processing device from a second user having a second right that is a right more restricted than the first right;
registering the first image processing device in the first printing service system when the registration instruction of the first image processing device is acquired, and registering the second image processing device in the first printing service system when the registration instruction of the second image processing device is acquired; and
transmitting a printing request to the second printing service system according to a printing job from the first printing service system, in which
in processing of transmitting the printing request,
in a case where the second image processing device is designated as an image processing device used in printing according to the printing job, the printing request for requesting printing by the second image processing device is transmitted to the second printing service system only when the printing job is a printing job corresponding to a printing instruction of the second user, and in a case where the first image processing device is designated as an image processing device used in printing according to the printing job, the printing request for requesting printing by the first image processing device is transmitted to the second printing service system regardless of the printing job is a printing job corresponding to a printing instruction of which user.

Appendix 8

A non-transitory computer-readable storage medium storing a program, the program causing a computer to execute following steps, the computer being a computer of a server connected to a first printing service system and a second printing service system, the second printing service system being connected to a first image processing device and a second image processing device, the steps including:

a registration reception step of acquiring a registration instruction of the first image processing device from a first user having a first right or a registration instruction of the second image processing device from a second user having a second right that is a right more restricted than the first right;

a registration step of registering the first image processing device in the first printing service system when the registration instruction of the first image processing device is acquired, and registering the second image processing device in the first printing service system when the registration instruction of the second image processing device is acquired; and a printing control step of transmitting a printing request to the second printing service system according to a printing job from the first printing service system, in which in the printing control step, in a case where the second image processing device is designated as an image processing device used in printing according to the printing job, the printing request for requesting printing by the second image processing device is transmitted to the second printing service system only when the printing job is a printing job corresponding to a printing instruction of the second user, and in a case where the first image processing device is designated as an image processing device used in printing according to the printing job, the printing request for requesting printing by the first image processing device is transmitted to the second printing service system regardless of the printing job is a printing job corresponding to a printing instruction of which user.

What is claimed is:

1. A server connected to a first printing service system and a second printing service system, the second printing service system being connected to a first image processing device and a second image processing device, the server comprising:

a registration reception unit configured to acquire a registration instruction of the first image processing device from a first user having a first right or a registration instruction of the second image processing device from a second user having a second right that is a right more restricted than the first right;

a registration unit configured to register the first image processing device in the first printing service system when the registration instruction of the first image processing device is acquired, and register the second image processing device in the first printing service system when the registration instruction of the second image processing device is acquired, wherein the registration unit registers the first image processing device and the second image processing device in the first printing service system as virtual devices; and a printing control unit configured to transmit a printing request to the second printing service system according to a printing job from the first printing service system, wherein in a case where the second image processing device is designated as an image processing device used in printing according to the printing job, the printing control unit transmits the printing request for requesting printing by the second image processing device to the second printing service system only when the printing job is a printing job corresponding to a printing instruction of the second user, and in a case where the first image processing device is designated as an image processing device used in printing according to the printing job, the printing control unit transmits the printing request for requesting printing by the first image processing device to the second printing service system regardless of the printing job is a printing job corresponding to a printing instruction of which user.

2. The server according to claim 1, further comprising:

a storage unit configured to store identification information of the second user that is a user who issued the registration instruction of the second image processing device, wherein the printing control unit determines whether to transmit the printing request for requesting printing by the second image processing device to the second printing service system by comparing the stored identification information of the second user with identification information of a user who issued a printing instruction corresponding to the printing job.

3. The server according to claim 1, further comprising:

a setting unit configured to set information for specifying a user who is accessible to the first image processing device or the second image processing device, that is, set information managed by the first printing service system, when the first image processing device or the second image processing device is registered, wherein when the setting is performed for the second image processing device, the setting unit performs setting such that only access from the second user among users having the second right is permitted.

4. The server according to claim 1, wherein
the server is included in the second printing service system.

5. A printing system comprising:
a first printing service system;
a first image processing device;
a second image processing device;
a second printing service system connected to the first image processing device and the second image processing device; and
a server connected to the first printing service system and the second printing service system, wherein
the server includes a registration reception unit configured to acquire a registration instruction of the first image processing device from a first user having a first right or a registration instruction of the second image processing device from a second user having a second right that is a right more restricted than the first right, a registration unit configured to register the first image processing device in the first printing service system when the registration instruction of the first image processing device is acquired, and register the second image processing device in the first printing service system when the registration instruction of the second image processing device is acquired, wherein the registration unit is configured to register the first image processing device and the second image processing device in the first printing service system as virtual devices, and a printing control unit configured to transmit a printing request to the second printing service system according to a printing job from the first printing service system, in a case where the second image processing device is designated as an image processing device used in printing according to the printing job, the printing control unit transmits the printing request for requesting printing by the second image processing device to the second printing service system only when the printing job is a printing job corresponding to a printing instruction of the second user, in a case where the first image processing device is designated as an image processing device used in printing according to the printing job, the printing control unit transmits the printing request for requesting printing by the first image processing device to the second printing service system regardless of the printing job is a printing job corresponding to a printing instruction of which user, and the first image processing device or the second image processing device executes printing processing based on the printing request.

6. An information processing method for a server connected to a first printing service system and a second printing service system, the second printing service system being connected to a first image processing device and a second image processing device, the information processing method comprising:

acquiring a registration instruction of the first image processing device from a first user having a first right or a registration instruction of the second image processing device from a second user having a second right that is a right more restricted than the first right;

registering the first image processing device in the first printing service system as a virtual device when the registration instruction of the first image processing device is acquired, and registering the second image processing device in the first printing service system as a virtual device when the registration instruction of the second image processing device is acquired; and transmitting a printing request to the second printing service system according to a printing job from the first printing service system, wherein in processing of transmitting the printing request, in a case where the second image processing device is designated as an image processing device used in printing according to the printing job, the printing request for requesting printing by the second image processing device is transmitted to the second printing service system only when the printing job is a printing job corresponding to a printing instruction of the second user, and in a case where the first image processing device is designated as an image processing device used in printing according to the printing job, the printing request for requesting printing by the first image processing device is transmitted to the second printing service system regardless of the printing job is a printing job corresponding to a printing instruction of which user.

\* \* \* \* \*

UNITED STATES PATENT AND TRADEMARK OFFICE
CERTIFICATE OF CORRECTION

| | | |
|---|---|---|
| PATENT NO. | : 12,210,782 B2 | Page 1 of 1 |
| APPLICATION NO. | : 18/366500 | |
| DATED | : January 28, 2025 | |
| INVENTOR(S) | : Yasuhiro Furuta et al. | |

It is certified that error appears in the above-identified patent and that said Letters Patent is hereby corrected as shown below:

On the Title Page

<u>Left-hand Column, under Item (65) please add the following:</u>
(30) Foreign Application Priority Data
Aug. 08, 2022 (JP) .................................. 2022-126318

Signed and Sealed this
First Day of July, 2025

Coke Morgan Stewart
*Acting Director of the United States Patent and Trademark Office*